US007502631B2

(12) United States Patent
Hashemi et al.

(10) Patent No.: US 7,502,631 B2
(45) Date of Patent: Mar. 10, 2009

(54) MONOLITHIC SILICON-BASED PHASED ARRAYS FOR COMMUNICATIONS AND RADARS

(75) Inventors: Hossein Hashemi, So. Pasadena, CA (US); Xiang Guan, Pasadena, CA (US); Seyed Ali Hajimiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 683 days.

(21) Appl. No.: 10/988,199

(22) Filed: Nov. 12, 2004

(65) Prior Publication Data

US 2005/0227660 A1 Oct. 13, 2005

Related U.S. Application Data

(60) Provisional application No. 60/519,715, filed on Nov. 13, 2003.

(51) Int. Cl.
*H04B 1/38* (2006.01)
*H04B 1/06* (2006.01)
*H04M 1/00* (2006.01)

(52) U.S. Cl. .................. 455/562.1; 455/273; 455/276.1

(58) Field of Classification Search .............. 455/550.1, 455/562.1, 272, 273, 275, 276.1, 323, 324, 455/333; 342/42, 374, 368, 373
See application file for complete search history.

(56) References Cited

U.S. PATENT DOCUMENTS 3,518,671 A 6/1970 Aasted et al.
6,005,515 A * 12/1999 Allen et al. ................. 342/374
6,194,947 B1 2/2001 Lee et al.
7,043,271 B1 * 5/2006 Seto et al. ................ 455/562.1
7,130,604 B1 * 10/2006 Wong et al. ................. 455/302

(Continued)

FOREIGN PATENT DOCUMENTS

WO WO 02/089252 A1 11/2002

OTHER PUBLICATIONS

Hashemi et al, "A 24 GHz SiGe Phased-Array Receiver: LO Phase Shifting Approach," Expanded version of the RFIC '04 paper # 1516 for the special MTT Transaction issue, Nov. 2004.

*Primary Examiner*—Nguyen Vo
(74) *Attorney, Agent, or Firm*—Townsend and Townsend and Crew LLP

(57) ABSTRACT

A phased-array receiver is adapted so as to be fully integrated and fabricated on a single silicon substrate. The phased-array receiver is operative to receive a 24 GHz signal and may be adapted to include 8-elements formed in a SiGe BiCMOS technology. The phased-array receiver utilizes a heterodyne topology, and the signal combining is performed at an IF of 4.8 GHz. The phase-shifting with 4 bits of resolution is realized at the LO port of the first down-conversion mixer. A ring LC VCO generates 16 different phases of the LO. An integrated 19.2 GHz frequency synthesizer locks the VCO frequency to a 75 MHz external reference. Each signal path achieves a gain of 43 dB, a noise figure of 7.4 dB, and an IIP3 of −11 dBm. The 8-path array achieves an array gain of 61 dB, a peak-to-null ratio of 20 dB, and improves the signal-to-noise ratio at the output by 9 dB.

59 Claims, 16 Drawing Sheets

U.S. PATENT DOCUMENTS

| | | | | |
|---|---|---|---|---|
| 7,260,418 | B2 * | 8/2007 | Natarajan et al. | 455/562.1 |
| 2002/0033768 | A1 | 3/2002 | Neeman et al. | |
| 2002/0103013 | A1 * | 8/2002 | Watson et al. | 455/562 |
| 2002/0111149 | A1 | 8/2002 | Shoki | |
| 2002/0169758 | A1 | 11/2002 | Yang | |
| 2003/0011519 | A1 | 1/2003 | Breglia et al. | |
| 2003/0020521 | A1 | 1/2003 | Lee et al. | |
| 2003/0107517 | A1 * | 6/2003 | Ikeda et al. | 342/372 |
| 2004/0005869 | A1 * | 1/2004 | See et al. | 455/102 |
| 2004/0087294 | A1 * | 5/2004 | Wang | 455/276.1 |
| 2005/0113035 | A1 | 5/2005 | Kyongyop | |
| 2008/0058019 | A1 * | 3/2008 | Natarajan et al. | 455/562.1 |

* cited by examiner

MONOLITHIC SILICON-BASED PHASED ARRAYS FOR COMMUNICATIONS AND RADARS

CROSS-REFERENCES TO RELATED APPLICATIONS

The present application claims benefit under 35 USC 119 (e) of the filing date of U.S. provisional application No. 60/519,715, filed on Nov. 13, 2003, entitled "Monolithic Silicon-Based Phased Arrays for Communications and RADARS", the content of which is incorporated herein by reference in its entirety.

BACKGROUND OF THE INVENTION

The present invention relates to wireless communications, and in particular to a phased-array receiver adapted for use in wireless communication systems.

Omni-directional communication systems have been used extensively in various applications due, in part, to their insensitivity to orientation and location. Such systems, however, have a number of drawbacks. For example, the transmitter in such systems radiates electromagnetic power in all directions, only a small fraction of which reaches the intended receiver; this results in a considerable amount of waste in the transmitted power. Thus, for a given receiver sensitivity, a relatively higher electromagnetic power needs to be radiated by an omni-directional transmitter. Furthermore, because the electromagnetic propagation is carried out in all directions, the effects of phenomenon such as multi-path fading and interference are more pronounced.

In a single-directional communication system, power is only transmitted in one or more desirable directions. This is commonly achieved by using directional antennas (e.g., a parabolic dish) that provide antenna gain for some directions, and attenuations for others. Due to the passive nature of the antenna and the conservation of energy, the antenna gain and its directionality are related; a higher antenna gain corresponds to a narrower beam width and vice versa. Single-directional antennas are often used when the relative location and orientation of the transmitter and receiver are known in advance and do not change quickly or frequently. For example, this may be the case in fixed-point microwave links and satellite receivers. Additional antenna gain at the transmitter and/or receiver of such a communication system may improve the signal-to-noise-plus-interference ratio (SNIR), and thereby increase the effective channel capacity. However, a single-directional antenna is typically not well adapted for portable devices whose orientation may require fast and frequent changes via mechanical means.

Multiple antenna phased-array systems may be used to mimic a directional antenna with a bearing adapted to be electronically steered without requiring mechanical movement. Such electronic steering provides advantages associated with the antenna gain and directionality, while concurrently eliminating the need for frequent mechanical reorientation of the antenna. Moreover, the multiple antennas disposed in phased-array systems alleviate the performance requirements for the individual active devices disposed therein, and thus make these systems more immune to individual device failure.

Multiple antenna phased-array systems (hereinafter alternatively referred to as phased-arrays) are often used in communication systems and radars, such as multiple-input-multiple-out (MIMO) diversity transceivers and synthetic aperture radars (SAR). Phased arrays enable beam and null forming in various directions. However, conventional phased-arrays require a relatively large number of microwave modules, adding to their cost and complexity.

Higher frequencies offer more bandwidth, while reducing the required antenna size and spacing. The industrial, scientific, and medical (ISM) bands at 24 GHz, 60 GHz are suited for broadband communication using multiple antenna systems, such as phased-arrays, and the 77 GHz band is suited for automotive RADARS. Furthermore, the delay spread at such high frequency bands is smaller than those of lower frequency bands, such as 2.4 GHz and 5 GHz, thus rendering such high frequency bands more effective for indoor uses, allowing higher data rates. A ruling by the FCC has opened the 22-29 GHz band for automotive radar systems, such as autonomous cruise control, in addition to the already available bands at 77 GHz.

A phased-array includes a multitude of signal paths each connected to a different one of a multitude of receive antennas. The radiated signal is received at spatially-separated antenna elements (i.e., paths) at different times. A phased-array is adapted to compensate for the time difference associated with the receipt of the signals at the multitude of paths. The phased-array combines the time-compensated signals so as to enhance the reception from the desired direction(s), while concurrently rejecting emissions from other directions.

The antenna elements of a phased-array receiver may be arranged in a number of different spatial configurations. In the following, a brief description of a one-dimensional n-element linear array is provided with reference to FIG. 1. It is understood that similar descriptions also apply to the transmitters and are not discussed.

For a plane-wave, the signal arrives at each antenna element with a progressive time delay t at each antenna. This delay difference between two adjacent elements is related to their distance, d, and the signal angle of incidence with respect to the normal, θ, as follows:

$$ct=d\sin(\theta) \quad (1)$$

where c is the speed of light. In general, the signal arriving at the first antenna element is defined by:

$$s_0(t)=A(t)\cos[w_ct+\phi(t)] \quad (2)$$

and where A(t) and φ(t) are the amplitude and phase of the signal and $\omega_c$ is the carrier frequency. The signal received by the kth element may be expressed as:

$$S_k(t)=S_0(t-k\tau)=A(t-k\tau)\cos[w_ct-kw_c\tau+\phi(t-k\tau)] \quad (3)$$

The equal spacing of the antenna elements is reflected in expression (3) as a progressive phase difference $w_c\tau$ and a progressive time delay t in A(t) and φ(t). Adjustable time delay elements, $\tau'_n$ (see FIG. 1) compensate for the signal delay and phase difference concurrently.

The combined signal $S_{sum}(t)$ may be expressed as, $$\begin{aligned} S_{sum}(t) &= \sum_{k=0}^{n-1} S_k(t-\tau'_k) \\ &= \sum_{k=0}^{n-1} A(t-k\tau-\tau'_k)\cos[\omega_c t-\omega_c\tau'_k-k\omega_c\tau+\varphi(t-k\tau-\tau'_k)] \end{aligned}$$

For $\tau'_k=-k\tau$, the total output power signal is defined by:

$$S_{sum}(t)=nA(t)\cos[w_ct+\phi(t)]$$

One known technique to obtain the time delay is by using broadband adjustable delay elements in the RF path. However, adjustable time delays at RF are challenging to integrate due to such non-ideal effects as, e.g., loss, noise, and nonlinearity.

While an ideal delay may compensate for differences in the arrival times at all frequencies, in narrowband applications it may be approximated differently. For a narrow band signal, A(t) and φ(t) change slowly relative to the carrier frequency, i.e., when $\tau \ll \tau_{modulate}$, the following approximations apply:

$$A(t) \approx A(t-\tau)$$

$$\phi(t) = \phi(t-kr)$$

Therefore, only the progressive phase difference $w_c\tau$ requires compensation in expression (3). The time delay element may be replaced by a phase shifter which provides a phase-shift of $\theta_n$ to the nth path. To add the signal coherently, $\theta_n$ may be defined by:

$$\theta_n = nw_c t (8)$$

Unlike wideband signals, phase compensation for a narrowband signal may be made at various locations in the receiving chain, i.e., RF, LO, IF, analog baseband, or digital domain. An additional advantage of a phased-array is that it is adapted to attenuate the incident interference power from other directions. FIG. 2 shows the normalized array gain of the receive pattern of an 8-element array adapted for a narrowband signal having a 45° angel of incidences The antenna spacing is assumed to be equal to d=λ/2, as shown in FIG. 1, where λ is the wavelength. It is seen from FIG. 2 that the signals incident from other angles are suppressed. Furthermore, the signal power in each path of a phased-array may be weighted to adjust the null positions or to obtain a lower side-lobe level.

As is known, in a receiver, for a given modulation scheme, a maximum acceptable bit error rate (BER) is related to a minimum signal-to-noise ratio, SNR, at the baseband output of the receiver (input of the demodulator). For a given receiver sensitivity, the output SNR sets an upper limit on the noise figure of the receiver. The noise figure, NF, is defined as the ratio of the total output noise power to the output noise power caused only by the source. For a single path receiver, the following applies:

$$10\ \mathrm{Log}(SNR_{out}) = 10\ \mathrm{Log}(SNR_{in}) - NF$$

This expression, however, does not apply directly to a phased-array. FIG. 3 shows an n-element phased-array system 10, which is adapted to add input signals $S_{in}$. The noise received from each antenna is $N_{in}$ Signal $N_1$ in each element represents the noise introduced in the path. A different amplifier 12 disposed in each path, amplifies the received signal and delivers the amplified signal to combiner block 14. The output of combiner block 14 is supplied to amplifier 16 which also receives and amplifies noise $N_2$. Output signal $S_{out}$ generated by amplifier 16 is defined as below:

$$S_{out} = n^2 G_1 G_2 S_{in}$$

Antenna's noise-contribution is, in part, determined by the temperature of the object(s) it is pointed at. When antenna noise sources are uncorrelated, the output total noise power is given by:

$$N_{out} = n(N_{in} + N_1)G_1 G_2 + N_2 G_2$$

Thus compared to the output SNR of a single-path receiver, the output SNR of the array is improved by a factor between n and $n^2$ depending on the noise and gain contribution of the different stages disposed in the array. The array noise factor may be defined as:

$$F = \frac{n(N_{in} + N_1)G_1 G_2 + N_2 G_2}{nN_{in} G_1 G_2}$$

$$F = n\frac{SNR_{in}}{SNR_{out}}$$

Therefore, the SNR at the output of a phased-array may even be smaller than SNR at the input of the phased-array if n>F, where F is the noise factor. For a given NF, an n-path phased-array receiver has a sensitivity that is greater than that of a single-path phased-array by a factor of 10*log(n) in dB. For instance, the sensitivity of an 8-path phased-array receiver is 9 dB greater than that of a single-path phased-array.

BRIEF SUMMARY OF THE INVENTION

In accordance with the present invention, an N-element phased-array receiver includes, in part, N RF mixers, and a signal summing block. Each RF mixer is adapted to receive a pair of input signals. The first signal applied to each RF mixer is an RF signal received by a receive antenna associated with that RF mixer. Accordingly, there are N receive antennas each associated with a different one of the N RF mixers. The second signal applied to each RF mixer is a local oscillator (LO) phase signal selected from among M phases of the local oscillator. Each of N phase selectors—each phase selector being associated with a different one of the N RF mixers—receives the M different phases of the local oscillator independently and, in response to one or more control signals, selects and supplies one of the M phases to its associated RF mixer. Therefore, the second signal applied to each RF mixer is a phase signal supplied thereto by the RF mixer's associated phase selector. The LO phase shifting is carried out at the LO input port of the RF mixers. In response to the received signals, each of the N RF mixers generates an output signal. The output signals generated by the N RF mixers are summed by the signal summing block and that is operative at the IF band. Consequently, in accordance with the present invention, the phase shifting is carried out at the local oscillator frequency, and the summing of the signals generated by the RF mixers is carried out at an IF. Signal summing block may sum the received signals in either current, voltage, or power domain. The summed signal is applied to a pair of IF mixers, which are also adapted to receive the I/Q signals of a divided-down replica of the local oscillator signal and to downconvert the received signals to a pair of I/Q baseband signals representative of the received IF signal.

In accordance with some embodiments, the phased-array receiver is operative at high RF frequencies, such as 24 GHz, and is formed on a single silicon substrate. In one embodiment, the phased-array receiver includes 8 elements and enables phase-shifting with, for example, 11.25° resolution at the local oscillator (LO) port of the first down-conversion mixer.

In such embodiments, each of eight receive antennas receives and delivers the RF signal, e.g., 24 GHz, that it receives to a different one of eight RF mixers. Each RF mixer also receives one of 16 phases of an LO. In response to the received signals, each RF mixer generates a current and supplies the generated current signal to a current summing block. The current summing block sums the received current signals and supplies the summed current to a pair of IF mixers.

An optional low noise amplifier disposed in each path amplifies the received RF signal from its associated antenna and supplies the amplified signal to its associated RF mixer. Moreover, an optional IF amplifier amplifies the signal generated by the summing block and delivers the amplified signal to each of the IF mixers. One of the IF mixers also receives a first phase signal generated by dividing the frequency of the locked LO signal. The other one of the IF mixers receives a second phase signal generated by dividing the frequency of the locked LO signal. The first and second phases signals so generated are 90° out of phase. In one embodiment, each of the sixteen discrete phases is provided with 4-bits (22.5°) of raw phase resolution. A symmetric binary tree structure distributes the LO phases.

In some embodiments, the LO phase selection for each path is done in two steps. First, an array of eight differential pairs with switchable current sources and a shared tuned load select one of the eight LO phase pairs. Additionally, phase interpolation may be achieved by selecting multiple LO phase pairs at substantially the same time so that a 11.25° phase shifting resolution is achieved by first order interpolation of two adjacent phases. Next, the polarity (the sign bit) of the LO is selected by a similar 2-to-1 phase selector providing all 16 LO phases.

Each of the IF mixers generates a signal that is representative of the RF signal received by the phased-array. The two signals generated by the two IF mixers are 90° out of phase. The IF mixers operate using, for example, a 4.8 GHz clock that is generated from the 19.2 LO clock using the divide-by-four block.

DETAILED DESCRIPTION OF THE INVENTION

Figure 1:
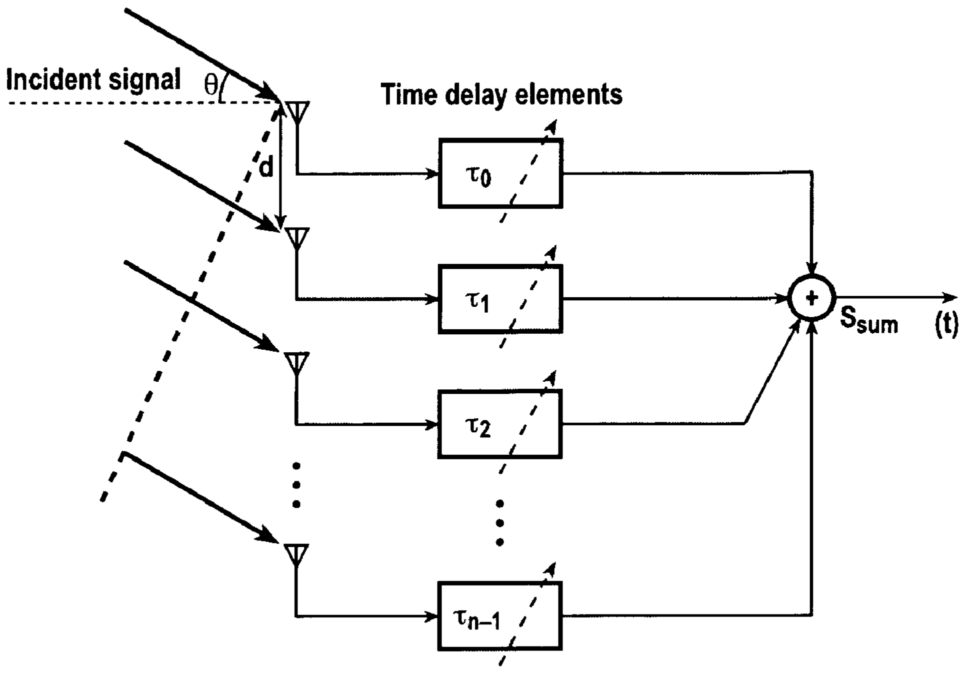
FIG. 1 is a simplified high-level view of an n-element antenna array, as known in the prior art.
Figure 2:
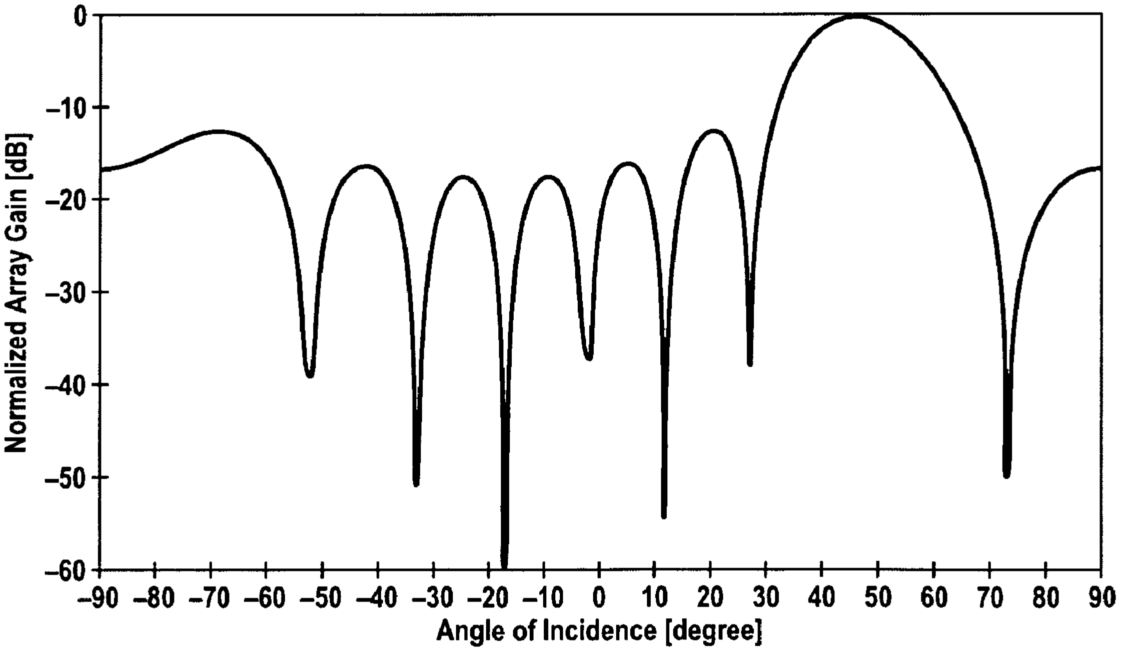
FIG. 2 shows the normalized array gain of the receive pattern of an 8-element array for a narrowband signal having a 45° angel of incidence, as known in the prior art.
Figure 3:
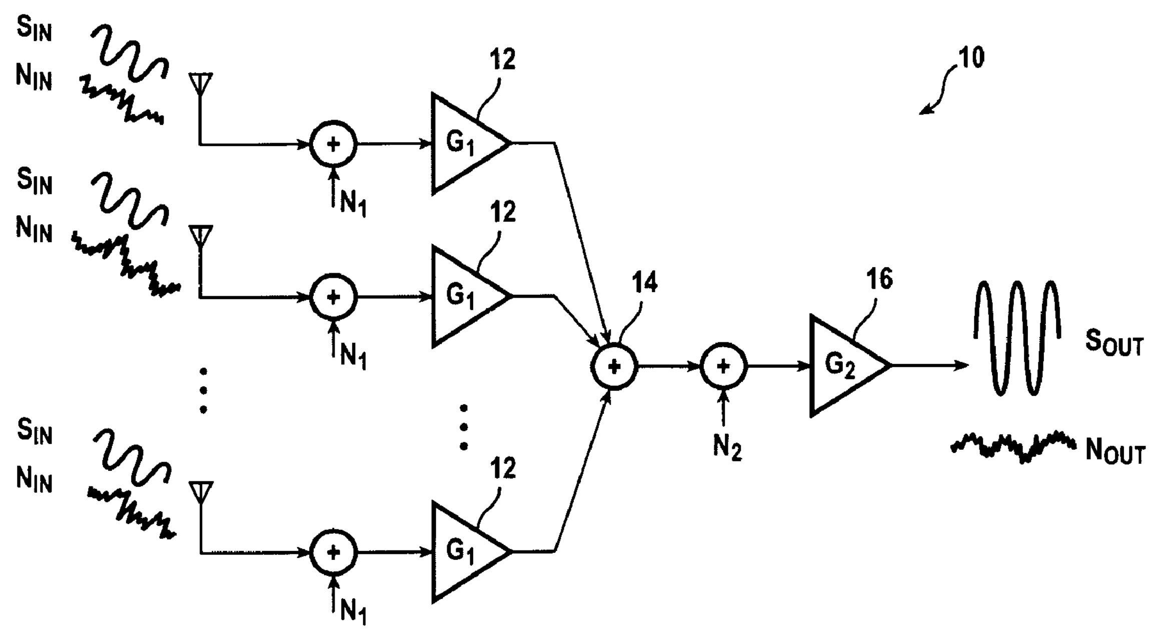
FIG. 3 is a simplified high-level view of an n-element phased-array receiver adapted to combine the signal received via its n antennas, as known in the prior art.
Figure 4A:
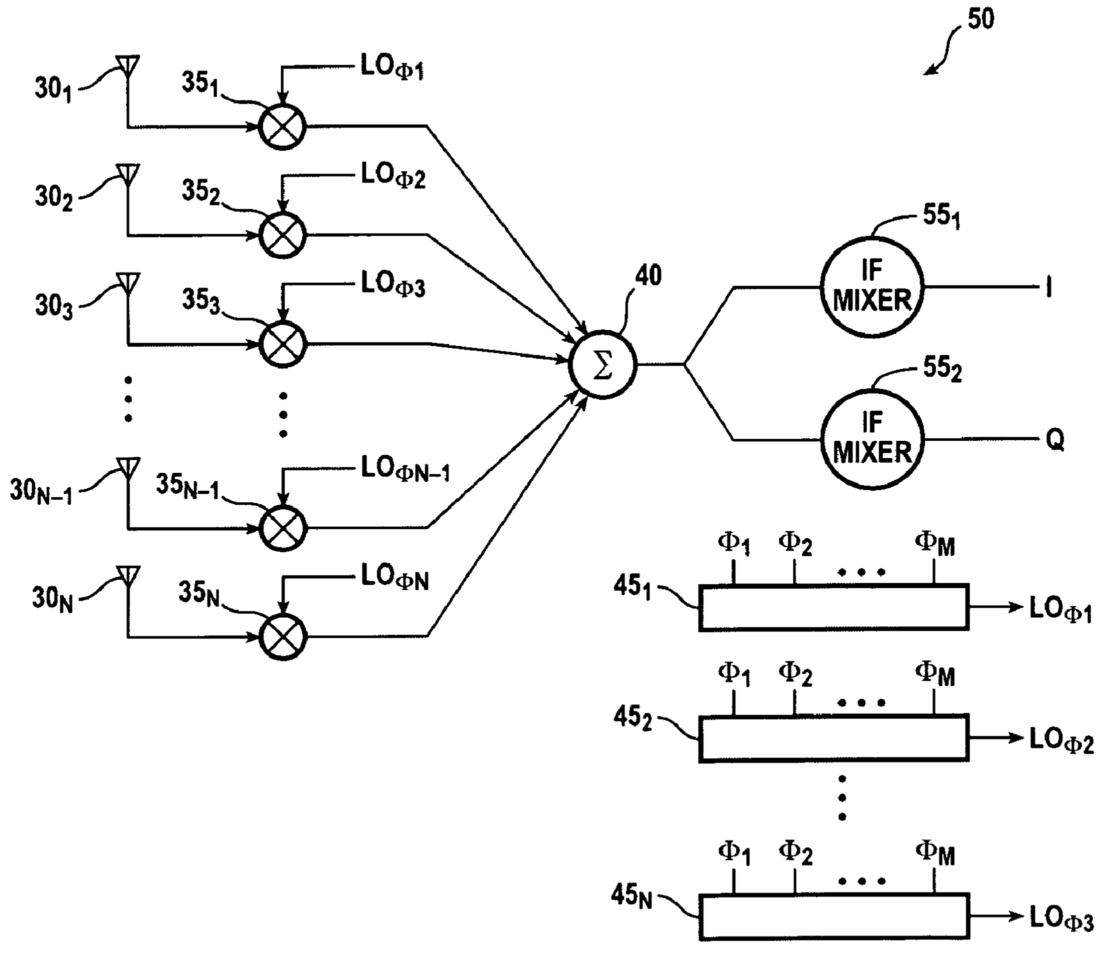
FIG. 4A is a simplified high-level block diagram of an N-element phased-array receiver, in accordance with one embodiment of the present invention.

In accordance with one embodiment of the present invention, an N-element phased-array receiver, such as phased-array receiver 50 shown in FIG. 4A, includes, in part, N RF mixers $\mathbf{35}_1$, $\mathbf{35}_2$, $\mathbf{35}_3$ . . . $\mathbf{35}_{N-1}$, $\mathbf{35}_N$, and a signal summing block 40. Each RF mixer $\mathbf{35}_i$, where i is an integer ranging from 1 to N, is adapted to receive a pair of input signals. The first signal applied to each RF mixer $\mathbf{35}_i$ is an RF signal received by a receive antenna $\mathbf{30}_i$ associated with that RF mixer $\mathbf{35}_i$. Accordingly, there are N receive antennas $\mathbf{30}_i$ each associated with a different one of the N RF mixers $\mathbf{35}_i$. The second signal applied to each RF mixer 35 is a phase signal $LO_{\phi i}$ selected from among M phases $\phi_1$, $\phi_2$ . . . $\phi_M$ of a local oscillator. Each of N phase selectors $\mathbf{45}_1$, $\mathbf{45}_2$, $\mathbf{45}_3$ . . . $\mathbf{45}_{N-1}$, $\mathbf{45}_N$—each phase selector being associated with a different one of the N RF mixers $\mathbf{35}_i$—receives the M different phases $\phi_1$, $\phi_2$, . . . $\phi_M$ of the local oscillator independently and, in response to one or more control signals, selects and supplies one of the M phases $LO_{\phi i}$ to its associated RF mixer $\mathbf{35}_i$. It is understood that the local oscillator phases applied to RF mixers $\mathbf{35}_i$ may be arbitrary phases of the local oscillator and thus may continuously vary.

As described above, the second signal applied to each RF mixer $\mathbf{35}_i$ is a phase signal supplied thereto by the RF mixer $\mathbf{35}_i$'s associated phase selector $\mathbf{45}_i$. The corresponding phase shifting is carried out at the local oscillator frequency. In other words, each RF mixer $\mathbf{35}_i$ both shifts the phase of the RF signal it receives and downconverts the frequency of the RF signal it receives to generate an IF output signal. The output signals generated by the N RF mixers $\mathbf{35}_i$ is summed by signal summing block 40 and that is operative at the IF band. Consequently, in accordance with the present invention, the phase shifting is carried out at the local oscillator frequency, and the summing of the signals is carried out at an IF. Signal summing block 40 may sum the received signals in either current, voltage, or power domain. The summed signal is applied to a pair of IF mixers $\mathbf{55}_1$ and $\mathbf{55}_2$, which are also adapted to receive the I/Q signals of either a divided-down replica of the local oscillator signal or the I/Q signals of the local oscillator, and to downconvert the received signals to a pair of I/Q baseband signals representative of the received IF signal.

Figure 4B:
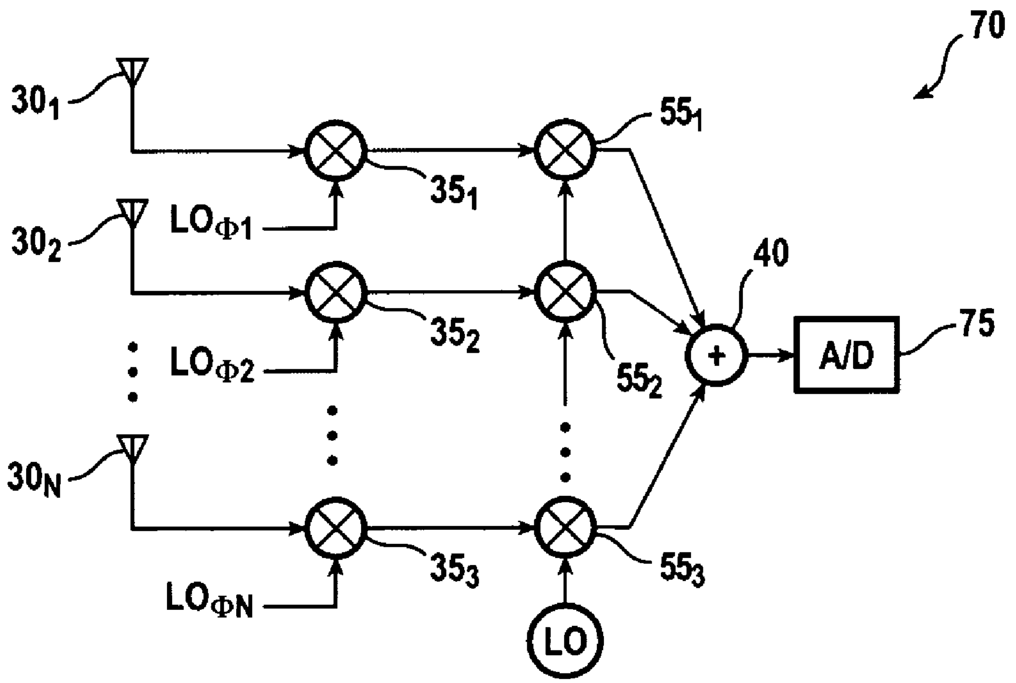
FIG. 4B is a simplified high-level block diagram of an N-element phased-array receiver, in accordance with another embodiment of the present invention.

FIG. 4B is a simplified high-level block diagram of an N-element phased-array receiver 70, in accordance with another embodiment of the present invention. Phased-array receiver 70 includes, in part, N RF mixers $\mathbf{35}_1$, $\mathbf{35}_2$, $\mathbf{35}_3$ . . . $\mathbf{35}_{N-1}$, $\mathbf{35}_N$, N IF mixers $\mathbf{55}_1$, $\mathbf{55}_2$, $\mathbf{55}_3$ . . . $\mathbf{55}_{N-1}$, $\mathbf{55}_N$ and a signal summing block 40. Each RF mixer $\mathbf{35}_i$ is adapted to receive a pair of input signals. The first signal applied to each RF mixer $\mathbf{35}_i$ is an RF signal received by a receive antenna $\mathbf{30}_i$ associated with that RF mixer $\mathbf{35}_i$. Accordingly, there are N receive antennas $\mathbf{30}_i$ each associated with a different one of the N RF mixers $\mathbf{35}_i$. The second signal applied to each RF mixer 35 is a phase signal $LO_{\phi i}$ selected from among M phases of a local oscillator. It is understood that the local oscillator phases applied to RF mixers $\mathbf{35}_i$ may be arbitrary phases of the local oscillator and thus may continuously vary. The corresponding phase shifting is carried out at the local oscillator frequency. In other words, each RF mixer $\mathbf{35}_i$ both shifts the phase of the RF signal it receives and downconverts the frequency of the RF signal it receives to generate an IF output signal that is delivered to an associated IF mixer $\mathbf{55}_i$. Each IF mixer $\mathbf{55}_i$ downconverts the frequency of the received IF signal to a lower frequency signal, e.g. a baseband signal, and delivers the downconverted signal to signal summing block 40. The output signal generated by summing block 40 is converted from analog to digital by analog-to-digital converter 75.

Figure 4C:
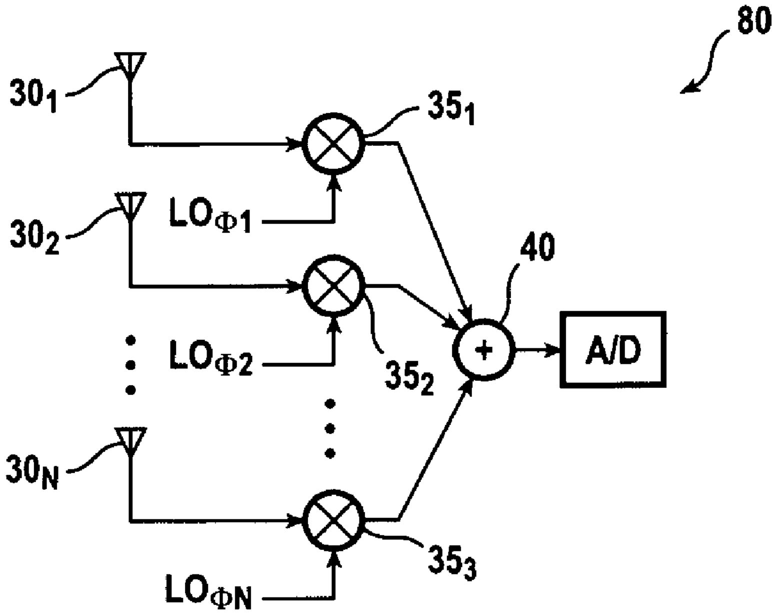
FIG. 4C is a simplified high-level block diagram of an N-element phased-array receiver, in accordance with yet another embodiment of the present invention.

FIG. 4C is a simplified high-level block diagram of an N-element phased-array receiver 70, in accordance with yet another embodiment of the present invention. Phased-array receiver 70 includes, in part, N RF mixers $\mathbf{35}_1$, $\mathbf{35}_2$, $\mathbf{35}_3$ . . . $\mathbf{35}_{N-1}$, $\mathbf{35}_N$ and a signal summing block 40. Each RF mixer $\mathbf{35}_i$ is adapted to receive a pair of input signals. The first signal applied to each RF mixer $\mathbf{35}_i$ is an RF signal received by a receive antenna $\mathbf{30}_i$ associated with that RF mixer $\mathbf{35}_i$. Accordingly, there are N receive antennas $\mathbf{30}_i$ each associated with a different one of the N RF mixers $\mathbf{35}_i$. The second signal applied to each RF mixer 35 is a phase signal $LO_{\phi i}$ selected from among M phases of a local oscillator. It is understood that the local oscillator phases applied to RF mixers $\mathbf{35}_i$ may be arbitrary phases of the local oscillator and thus may continuously vary. The corresponding phase shifting is carried out at the local oscillator frequency. In other words, each RF mixer $\mathbf{35}_i$ both shifts the phase of the RF signal it receives and downconverts the frequency of the RF signal it receives to generate a lower frequency, e.g., baseband, output signal that is delivered to signal summing block 40. Therefore, in accordance with embodiment 80, downconversion of the frequency of the RF signal to a lower frequency signal, e.g. a baseband signal, is carried out using a single mixing stage. Signal summing block 40 sums the received N, e.g., baseband signals and supplies the summed signal to analog-to-digital converter 75.

Figure 5:
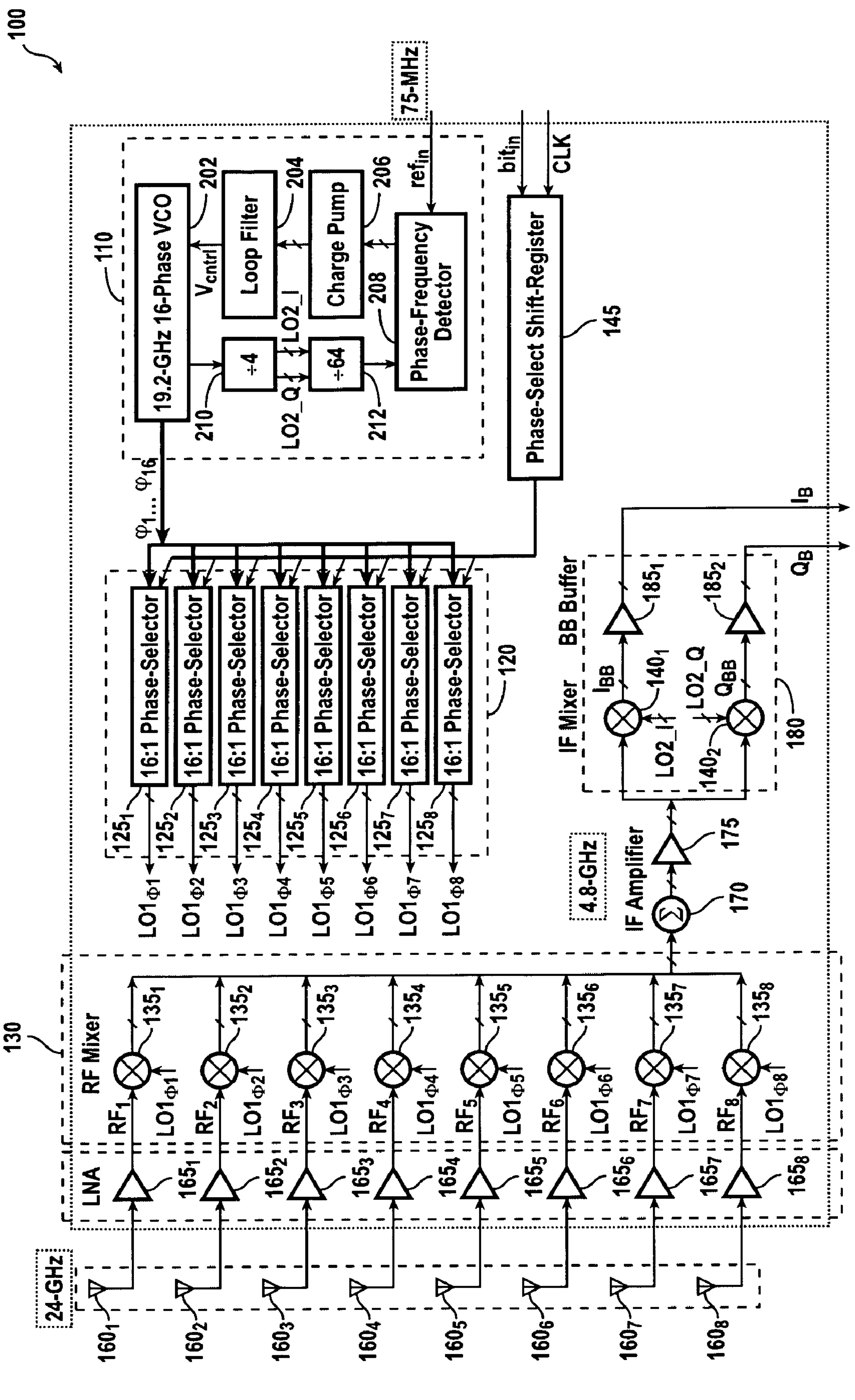
FIG. 5 is a high-level block diagram of an exemplary 8-element phased-array receiver, in accordance with one embodiment of the present invention.

FIG. 5 is a high-level block diagram of an exemplary phased-array receiver 100, in accordance with one embodiment of the present invention. Phased-array receiver 100 is shown as being an 8-element phase array. It is understood, however, that a phased-array, in accordance with the present invention may have more, e.g., 16, or fewer, e.g., 4, elements. Phased-array receiver 100 is adapted so as to be fully integrated on a single silicon substrate. As such, phased-array receiver 100 facilitates on-chip functions, such as signal processing and conditioning, thus obviating the need for such off-chip functions. Furthermore, phased-array receiver 100 has a relatively smaller size and cost of manufacture, consumes less power, and has an enhanced reliability. Phased-array receiver 100 is adapted to be operable at relatively high frequencies, such as 24 GHz, and enables phase-shifting with 11.25° resolution at the local oscillator (LO) port of the first down-conversion mixer. Each signal path achieves a gain of 43 dB, noise figure of 7.4 dB, and an IIP3 of −11 dBm. The 8-element array improves SNR at the baseband output by 9 dB, providing an array gain of 61 dB and a peak-to-null ratio of 20 dB, as described further below.

Exemplary phased-array receiver 100 (hereinafter alternatively referred to as array 100) is shown as including, in part, a phase generator 110, a phase selection block 120, an RF mixing block 130, and an IF mixing block 180. Phase-generator 110, which is a closed-loop control circuit, is adapted to lock a 19.2 GHz local oscillator clock, after the oscillator clock is divided by 256, to the reference clock $Ref_{in}$, which is a 75 MHz clock. Phase-generator 110 generates and applies 16 generated phases $\phi_1, \phi_2, \ldots, \phi_{16}$ of the locked 75 MHz clock signal to phase selection block 120. In some embodiments, each of the generated phase $\phi_1, \phi_2, \ldots, \phi_{16}$ is a differential signal having a differentially positive signal and a differentially negative signal (not shown). For example, in such embodiments, phase signal $\phi_1$ includes a pair of signals, namely a differentially positive signal $\phi^+$1 and a differentially negative signal $\phi^-$1 . It is understood that the 16 generated phases $\phi_1, \phi_2, \ldots, \phi_{16}$ of the local oscillator may be arbitrary phases of the local oscillator and thus may continuously vary.

Figure 6:
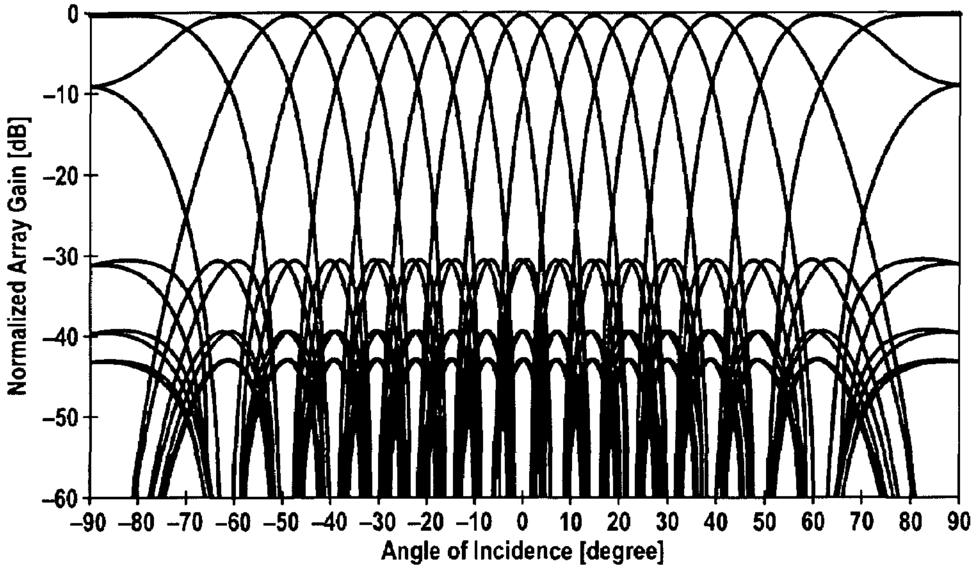
FIG. 6 shows an exemplary computer simulation results for the phased-array receiver of FIG. 5.

Phase generator 110 is shown in FIG. 5 as being a phased-locked loop circuit. It is understood that phase generator 110 may be a delay-locked loop or any other closed-loop control circuit adapted to lock to the phase or frequency of the reference clock signal $Ref_{in}$. Phase generator 110 is shown as including in part, a voltage-controlled oscillator 202, a loop filter 204, a charge pump 206, a phase-frequency detector 208, a divide-by-four block 210, and a divide-by-64 block 212. The 16 phase signals $\phi_1, \phi_2, \ldots, \phi_{16}$ are generated by VCO 202. Each of the sixteen discrete phases is provided with 4-bits (22.5°) of raw phase resolution. FIG. 6 shows the simulation result of 16 corresponding array-patterns for the 8-element phased array receiver 100, in which the spacing between adjacent antennas is $\lambda/2$. As seen from FIG. 6, phased-array receiver 100 is capable of steering the beam from −90° to +90° and at a steering step size of 7.2° at the normal direction.

Phase selection block 120 is adapted to include 8 phase selectors 125, each adapted to select one of the received sixteen shifted phases $\phi_1, \phi_2, \ldots, \phi_{16}$. In the following, different instances of similar components are alternatively identified by similar reference numerals having different indices—the indices appear as subscripts to the reference numerals. For example, the eight shown instances of phase selectors may be identified as $\mathbf{125}_1$, $\mathbf{125}_2$, $\mathbf{125}_3$ . . . $\mathbf{125}_8$. Alternatively the phase selectors may be identified with reference numeral 125. The 16 generated phases $\phi_1, \phi_2, \ldots, \phi_{16}$ are applied to each of the phase selectors $\mathbf{125}_i$ with equal amplitudes and delays.

Each phase selector $\mathbf{125}_i$ is adapted to select and supply at its output one of the sixteen generated phases $\phi_1, \phi_2, \ldots, \phi_{16}$ in response to the signal that phase selector $\mathbf{125}_i$ receives from phase-select shift-register 145. The operating state of phased-array receiver 100, including phase-selection information (beam-steering angle) is serially loaded into phase-select shift-register 145 using a standard serial interface. Phase selector $\mathbf{125}_1$ is shown as selecting one of the sixteen received phases $\phi_1, \phi_2, \ldots, \phi_{16}$ and supplying the selected phase as output signal $\mathbf{LO1}_{\phi 1}$. Similarly, phase selector $\mathbf{125}_2$ is shown as supplying output signal $\mathbf{LO1}_{\phi 2}$, etc. Each output signals $\mathbf{LO1}_{\phi i}$, supplied by its associated phase selector $\mathbf{125}_i$, is applied to a different one of 8 RF mixers $\mathbf{135}_i$ disposed in RF mixing block 130. In some embodiments, each selected phase $\mathbf{LO1}_{\phi i}$ is a differential signal having a differentially positive signal and a differentially negative signal. For example in such embodiments, phase signal $\mathbf{LO1}_{\phi 1}$ includes a pair of signals, namely a differentially positive signal $\mathbf{LO1}^{+}_{\phi 1}$ and a differentially negative signal $\mathbf{LO1}^{-}_{\phi 1}$.

In one embodiment, VCO 202 which generates the 16 phases of the LO clock, includes a ring of eight differential CMOS amplifiers with tuned loads. The center frequency of the VCO in such embodiments is locked by a third-order frequency synthesizer to the 75 MHz reference clock $\mathrm{Ref}_{in}$. The 16 phases so generated are distributed to phase selectors $\mathbf{125}_i$ of each of the 8 paths through a symmetric binary tree structure, thereby providing each path with an independent access to all 16 phases $\phi_1, \phi_2, \ldots, \phi_{16}$ of the LO.

Figure 7A:
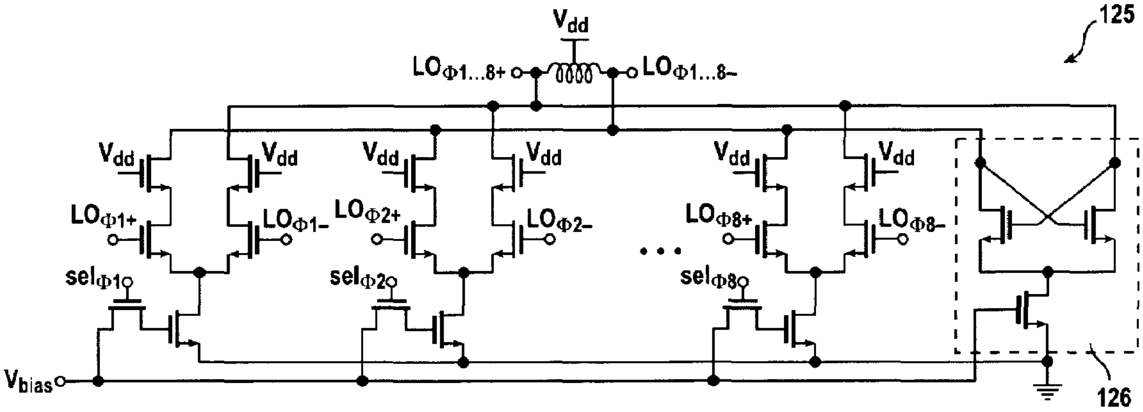
FIGS. 7A and 7B are transistor schematic diagrams of the phase selection circuit disposed in the phased-array receiver of FIG. 5, in accordance with one embodiment.
Figure 7B:
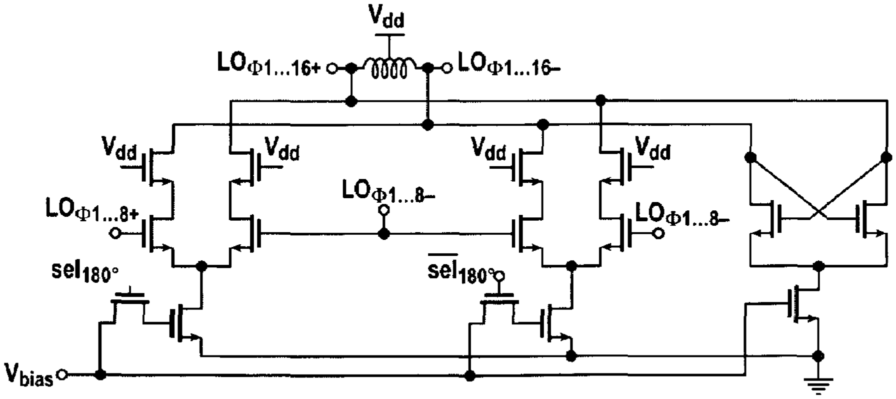

FIGS. 7A and 7B collectively are the transistor schematic diagrams of each phase selector $\mathbf{125}_i$, in accordance with one embodiment in which differential signals are used. As is seen, the LO phase selection for each path is done in two stages, shown respectively in FIGS. 7A and 7B. During the first stage, shown in FIG. 7A, an array of eight differential pairs with switchable current sources and a shared tuned load selects one of the eight LO phase pairs. Additionally, phase interpolation may be achieved by selecting multiple LO phase pairs at substantially the same time so that a 11.25° phase shifting resolution is achieved by first order interpolation of two adjacent phases. A dummy array 126 with complementary switching signals maintains a constant load on the VCO buffers and prevents variations in phase while switching. During the second stage, shown in FIG. 7B, the polarity (the sign bit) of the LO is selected by a similar 2-to-1 phase selection circuitry. The second phase selection stage shown in FIG. 7B also provides additional gain to compensate for the loss of the distribution network. In one embodiment, each phase selector $\mathbf{125}_i$ consumes approximately 12 mA.

Referring to FIG. 5, each of eight receive antennas $\mathbf{160}_i$ receives and delivers the RF signal that it receives to a different one of eight RF mixers $\mathbf{135}_i$—that are disposed in the RF mixing block 135—via a different one of eight optional low-noise amplifiers (LNA) $\mathbf{165}_i$. Each RF mixer $\mathbf{135}_i$ also receives the phase signal selected by its associated phase selector $\mathbf{125}_i$, and in response generates a signal that is delivered to a summing block 170 operative at the IF. The IF summing block 170 sums the 8 signals that it receives from the 8 RF mixers $\mathbf{135}_i$ and delivers the summed signal to IF mixing block 180. Optional amplifier 175 amplifies the summed signal and delivers the amplified signal to IF mixing block 180. IF summing block 170 may sum the received signals in current domain, voltage domain, power domain, etc.

In the exemplary embodiment of phased-array receiver 100, IF summing block 170 operates using a 4.8 GHz clock that is generated from the 19.2 GHz LO clock by the divide-by-four block 210—disposed in phase generator 110. Therefore, in accordance with the present invention, phased-array receiver 100 uses a two-step down conversion with an IF of 4.8 GHz, allowing both LO frequencies to be generated using a single phase generator and a frequency divider. The image at 14.4 GHz is attenuated by the narrowband transfer function of the font-end blocks, with each front-end block including an antenna $\mathbf{160}_i$ and an associated LNA $\mathbf{165}_i$.

Figure 8:
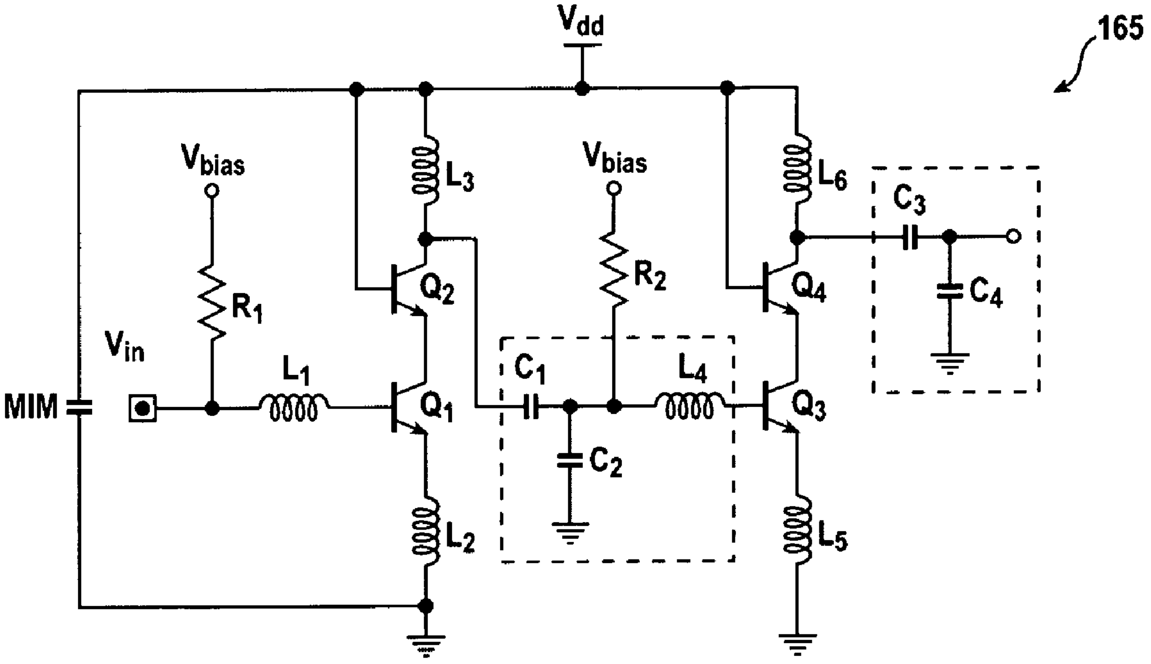
FIG. 8 is a transistor schematic diagram of the low-noise amplifiers disposed in the phased-array receiver of FIG. 5, in accordance with one embodiment.

FIG. 8 is a transistor schematic diagram of each LNA $\mathbf{165}_i$. Each LNA $\mathbf{165}_i$ is adapted to provide the gain needed to suppress the noise of its associated RF mixer $\mathbf{135}_i$ by using a low noise factor, and a well-defined real input impedance, for example, 50 Ω. Each LNA $\mathbf{165}_i$ is also adapted to operate using a relatively low power so as to reduce the amount of power that is consumed by the LNAs together and which operate concurrently. Each LNA $\mathbf{165}_i$ generates an output voltage signal Vout in response to the input voltage signal Vin that LNA $\mathbf{165}_i$ receives from its associated antenna $\mathbf{160}_i$.

The dramatic increase in the speed of bipolar and CMOS transistors over the last decade and novel design techniques have extended the operating range of integrated silicon-based LNAs from low GHz to much higher frequency bands. The choice of topologies depends on the ratio of the operation frequency, $w_0$, to the transistor cut-off frequency, $W_t$. The inductively degenerated common-emitter LNA, shown in FIG. 8, is adapted to provide a high gain and low noise for a small $W_0/w_t$. When $w_0$ becomes comparable to $w_t$, the common-base LNA provides competitive performance. Using this method the achievable noise figure of a common-base LNA is significantly reduced. In some embodiments, LNA 165 is formed using a SiGe hetero-junction bipolar transistor (HBT) with a cut-off frequency of 120 GHz; this corresponding to a $w_0/w_t$ of 0.2. It is understood that LNA 165 may be formed using Bipolar, CMOS or BICMOS process technologies.

Referring to FIG. 8, the input transistor sizes and dc current are so chosen as to achieve concurrent power and noise matching. First, the current density associated with minimum noise figure is found by computer simulation. Next, the input transistor is scaled until the optimum input impedance for low noise has the required real part in ohms, e.g., 50 ohms in some embodiments. In some embodiments, the optimization results in a DC current of 4 mA and an emitter degeneration inductance of 0.2 nH. The cascode transistor Q2 is used to improve reverse isolation.

At relevant high frequencies, e.g., 24 GHz, the available gain of a single stage is limited by the small load inductance due to the large collector capacitance of Q2 and the load capacitance. In some embodiments, if the power gain achieved by one low-noise amplifier 165 in each path is insufficient to suppress the noise of the subsequent stages in that path, a second low-noise amplifier 165 is cascaded with the first low-noise amplifier 165 in that path. When so cascaded (not shown), voltage Vout of the first low-noise amplifier $\mathbf{165}_i$ in each path is supplied to the Vin of the second low-noise amplifier $\mathbf{165}_i$ in that path. Voltage Vout of the second low-noise amplifier $\mathbf{165}_i$ in each path is subsequently supplied to the RF mixer $\mathbf{135}_i$ in that path.

Furthermore, at such high frequencies, the interactions between various blocks may make some blocks sensitive to variations in other adjacent blocks. To minimize this sensitivity, in one embodiment, input and output of each block is matched to 50 Ω. This minimizes the effect of one block's performance on the performance of adjacent blocks, thus enabling each block to be designed and optimized independently.

A capacitive divider formed by capacitors C1 and C2 transforms the output impedance of the first stage to the input impedance of the second stage, e.g., to the same 50 Ω, to optimize the impedance for the second stage as it relates to both power and noise. In some embodiments, capacitors C1 and C2 are chosen to be 100 fF and 180 fF, respectively, and inductor L4 has an inductance of 0.2 nH, which results in consumption of 50 μm×50 μm silicon surface area using one fabrication process. The matching network loss at 24 GHz is simulated to be lower than 0.25 dB.

At high frequencies, e.g., 24 GHz, the bond wire inductance has a considerable effect on the input reflection coefficient of each LNA 165$_i$. Accordingly, each LNA 165$_i$ is designed to be matched to 50 ohm ($S_{11}$ less than −10 dB, where $S_{11}$ is the input reflection coefficient) on chip and to be tolerant to bond wire inductance of, e.g., up to 0.3 nH. The voltage supply lines Vdd and ground of each LNA 165$_i$ are bypassed on chip with an MIM capacitor resonating at 24 GHz. In some embodiments, each inductor used in each LNA 165$_i$ has an inductance between 0.2 nH to 0.5 nH. To save silicon area, spiral inductors may be used. Slab inductors which are known to provide higher quality factors may also be used. All spiral inductors and interconnections are modeled using IE3D simulation tools, available from Bay Technology, located at 1711 Trout Gulch Road, Aptos, Calif. 95003.

Figure 9:
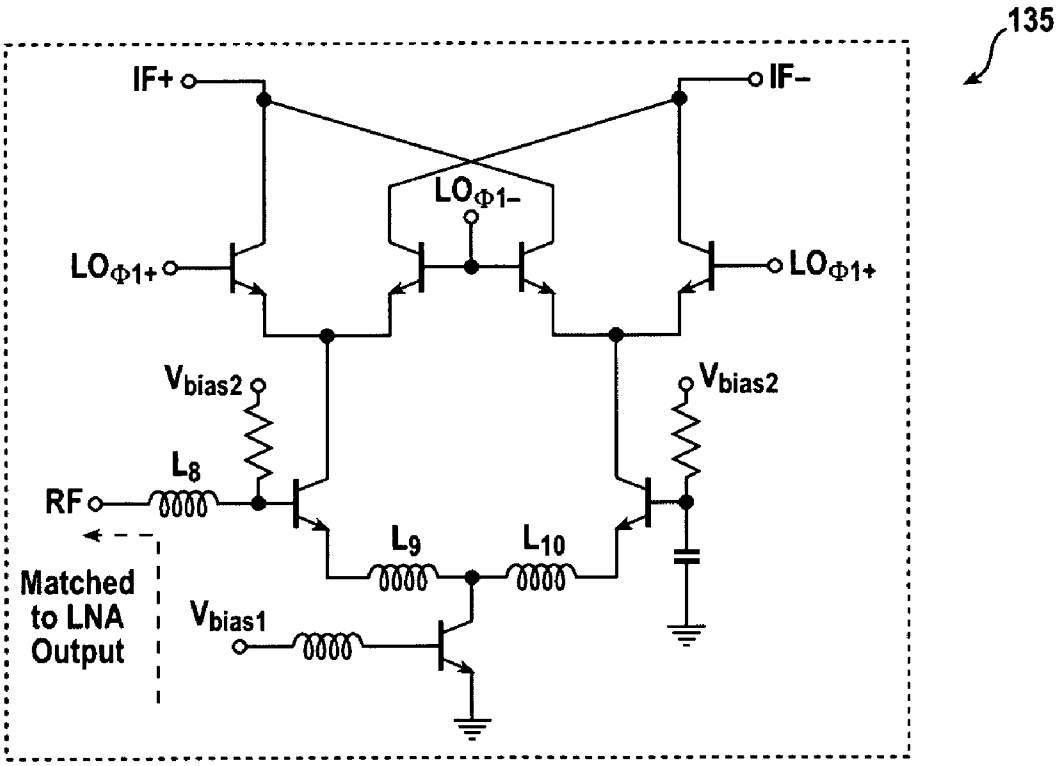
FIG. 9 is a transistor schematic diagram of the RF mixers disposed in the phased-array receiver of FIG. 5, in accordance with one embodiment.

FIG. 9 is a transistor schematic diagram of each RF mixer 135$_i$, in accordance with one embodiment. As seen, each RF mixer 135$_i$ includes a Gilbert-type double-balanced multiplier adapted to downconvert the single-ended 24 GHz RF signal to a differential 4.8 GHz IF signal. For each RF mixer 135$_i$, input signal RF is received from LNA 165$_i$ associated with RF mixer 135$_i$, and differential signals $LO1^+_{\phi i}$ and $LO1^-_{\phi i}$ are received from phase selector 125$_i$ also associated with RF mixer 135$_i$. Therefore, for the embodiment shown in FIG. 9, it is understood that each of phases $\phi_1, \phi_2, \ldots, \phi_{16}$, and thus each of phases $LO1^+_{\phi 1}$, $LO1_{\phi 2}$, . . . , $LO1_{\phi 16}$ is a differential signal. LO phase shifting renders phased-array receiver 100 less sensitive to the amplitude variations at the LO ports of RF mixers 135$_i$.

The input stage of each RF mixer 135$_i$ is conjugate matched to the output stage of its associated LNA 165$_i$ through an impedance transforming network; this matching network includes capacitors $C_1$, $C_2$, $L_4$, $C_3$, $C_4$ of LNA 165$_i$ and inductor $L_8$ of RF mixer 135$_i$. Inductive emitter degeneration—formed by inductors $L_9$, $L_{10}$—is used to improve linearity. In one embodiment, a DC bias current of 1.25 mA is chosen for each RF mixer 135$_i$ so as to provide a trade-off between power dissipation, linearity, and noise figure. In one embodiment, each RF mixer 135$_i$ has a conversion transconductance of 6.5 mS. Bias voltages $V_{bias1}$ and $V_{bias2}$ are generated using a bandgap circuitry (not shown). Each RF mixer 135$_i$ of FIG. 9 generates a pair of differential currents $IF^+_i$ and $IF^-_i$ that are delivered to the IF summing block 170.

Figure 10:
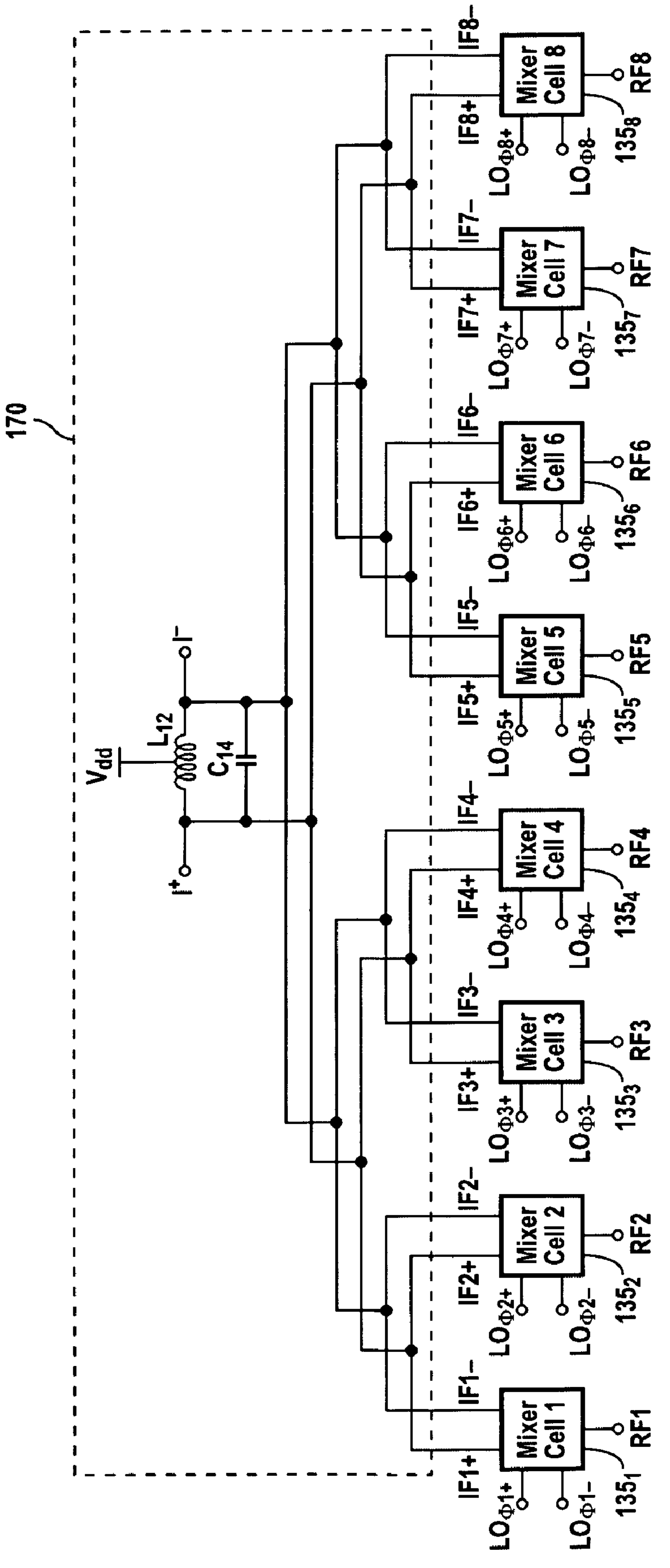
FIG. 10 is a high-level block diagram of the IF summing block disposed in the phased-array receiver of FIG. 5, in accordance with one embodiment.

FIG. 10 is a block diagram of IF summing block 170 as coupled to the RF mixer 135$_1$, 135$_2$ . . . 135$_8$, in accordance with one embodiment of the present invention. As seen, IF summing block 170 receives 8 pairs of differential current signals $IF^+_i$ and $IF^-_i$ from RF mixers 135$_i$ and combines these currents through a symmetric binary tree that is terminated to a tuned load formed by inductor $L_{12}$ and capacitor $C_{14}$. IF summing block 170 operates at 4.8 GHz to generate differential output current signals $I^+$ and $I^-$ that are subsequently delivered to IF amplifier 175. The noise contribution of such blocks in overall noise figure is not only suppressed by the single-path gain of the front-end, but also by the array gain of 8. It is understood that in some embodiments, the current generated by IF summing block 170 is a single-ended signal. It is also understood that IF summing block 170 may be adapted to sum voltage signals, either differentially or otherwise, if, for example, the signals delivered thereto are voltage signals.

Figure 11:
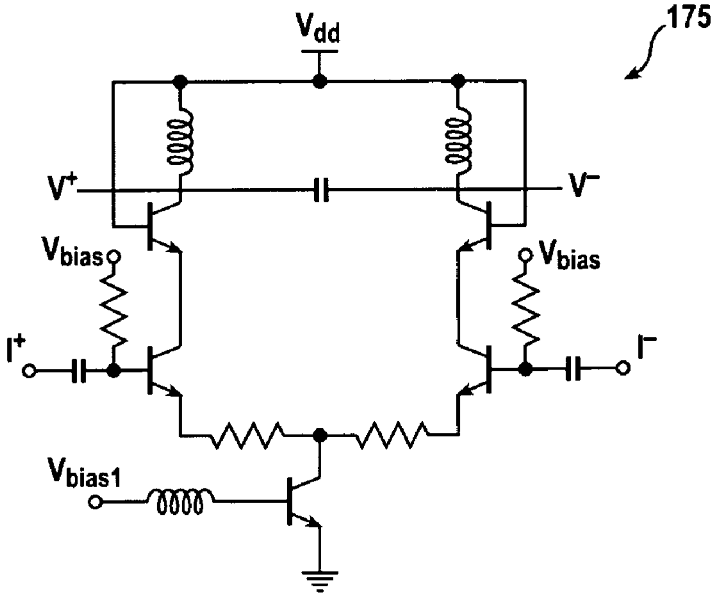
FIG. 11 is a transistor schematic diagram of the IF amplifier block disposed in the phased-array receiver of FIG. 5, in accordance with one embodiment.

FIG. 11 is a transistor schematic diagram of IF amplifier 175, in accordance with one embodiment, that is optionally disposed between IF summing block 170 and IF mixing block 180. IF amplifier 175 receives the differential signals $I^+$ and $I^-$ from IF summing block 170, and in response, generates differential voltage signals $V^+$ and $V^-$. The level of interference arriving at the input terminals of the IF amplifier 175 is attenuated by the spatial selectivity of the array pattern. In accordance with the present invention, both noise and linearity requirements of the IF amplifier 175 and circuit blocks receiving signals from IF amplifier 175 are relaxed.

Figure 12:
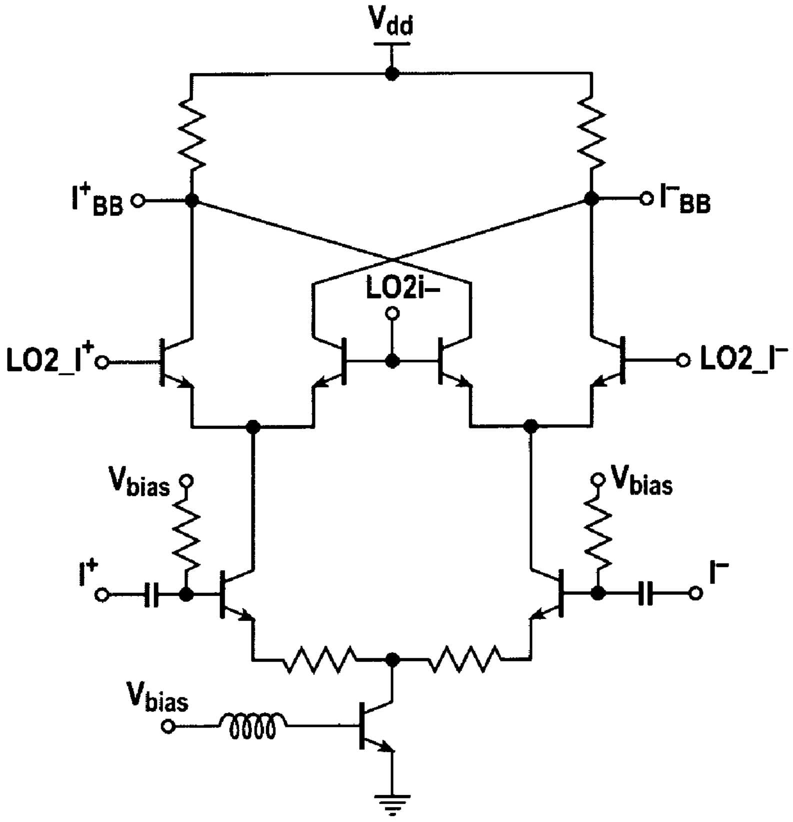
FIG. 12 is a transistor schematic diagram of the IF mixer adapted to generate an IF signal representative of the received RF signal, in accordance with one embodiment.

FIG. 12 is a transistor schematic diagram of IF mixer 140$_1$, in accordance with one embodiment, disposed in IF mixing block 180. In the embodiment shown in FIG. 12, IF mixer 140$_1$ is further adapted to receive differential signals LO2_I$^+$ and LO2_I$^-$ that are generated by dividing the frequency of the locked LO clock by four using divide-by-four block 210. Therefore, for the embodiment shown in FIG. 12, it is understood that signal LO2_I shown in FIG. 5 is a differential signal.

In response to the signals received thereby, IF mixer 140$_1$ generates signal $I_{BB}$. It is understood that signal $I_{BB}$ may include a pair of differential signal $I_{BB}^+$ and $I_{BB}^-$, as shown in the embodiment of FIG. 12. Signals $I_{BB}$ is representative of the RF signal received by phased-array 100. Optional buffer 185$_1$ buffers receives the signals $I_{BB}$, and in response generates buffered signal $I_B$. In one embodiment, IF amplifier 175 and each IF mixer 140 consumes 1.6 mA and 2.3 mA of DC currents, respectively.

Figure 13:
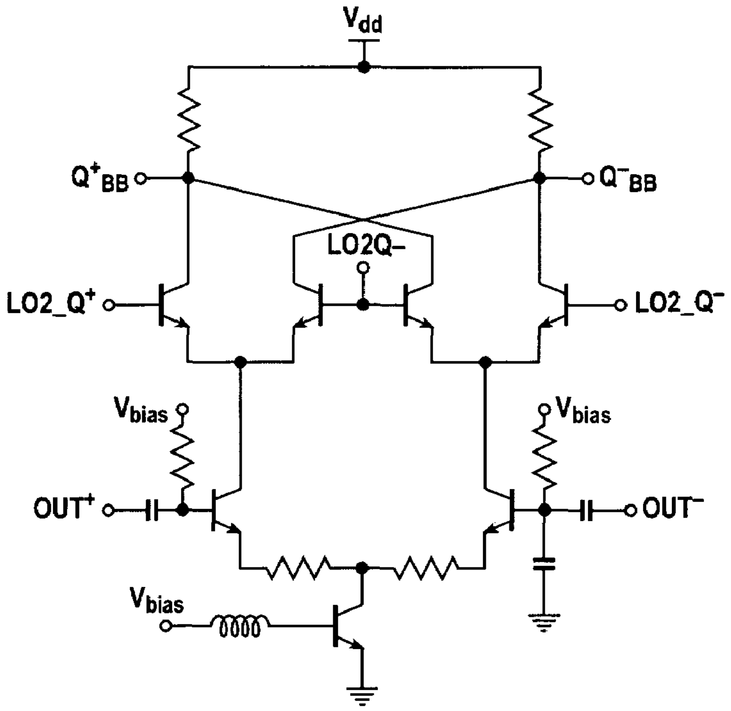
FIG. 13 is a transistor schematic diagram of the IF mixer adapted to generate an IF signal having a phase that is shifted with respect to the IF signal of the IF mixer of FIG. 12.

FIG. 13 is a transistor schematic diagram of IF mixer 140$_2$, in accordance with one embodiment. In the embodiment shown in FIG. 13, IF mixer 140$_2$ is further adapted to receive differential signals LO2_Q$^+$ and LO2_Q$^-$ that also are generated by dividing the frequency of the locked LO clock by four using divide-by-four block 210. Therefore, for the embodiment shown in FIG. 13, it is understood that signal LO2_Q shown in FIG. 5 is a differential signal. Signals LO2_I and LO2_Q have a 90° phase shift with respect to one another.

In response to the signals received thereby, IF mixer 140$_2$ generates signal $Q_{BB}$. It is understood that signal $Q_{BB}$ may include a pair of differential signal $Q_{BB}^+$ and $Q_{BB}^-$, as shown in the embodiment of FIG. 12. Signals $Q_{BB}$ is representative of the RF signal received by phased-array 100 and has a 90° phase shift with respect to signal $I_{BB}$. Optional buffer 185$_2$ buffers receives the signals $Q_{BB}$, and in response generates buffered signal $I_B$.

EXPERIMENTAL RESULTS

Figure 14:
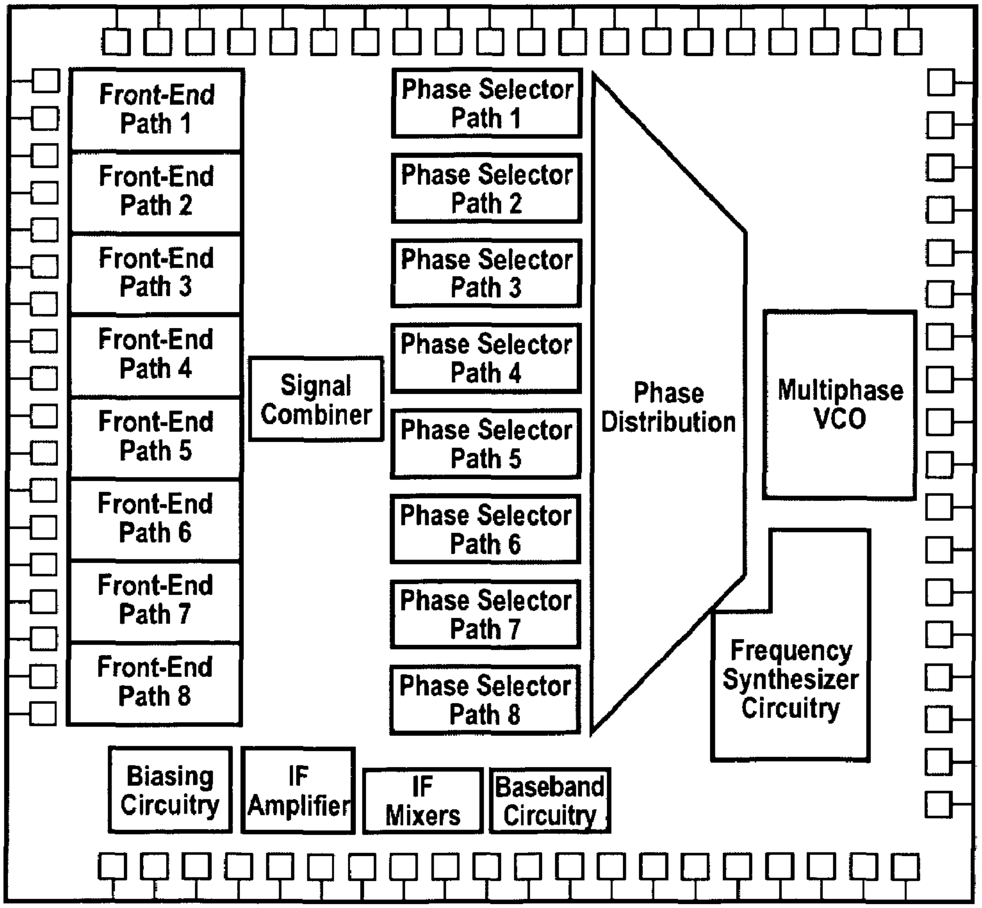
FIG. 14 is a die micrograph of the phased-array receiver of FIG. 5 fabricated using an exemplary SiGe BiCMOS technology.

In accordance with one experiment, phased array receiver 100 is implemented in IBM 7HP SiGe BiCMOS technology with a bipolar $f_T$ of 120 GHz and 0.18 μm CMOS transistors. This technology provides five metal layers with a 4 μm-thick top analog metal used for on-chip spiral inductors as well as transmission lines routing the high-frequency signals. The die micrograph of the phased-array receiver 100 is shown in FIG. 14. The size of the chip in this experiment is 3.3×3.5 mm2.

Figure 15A:
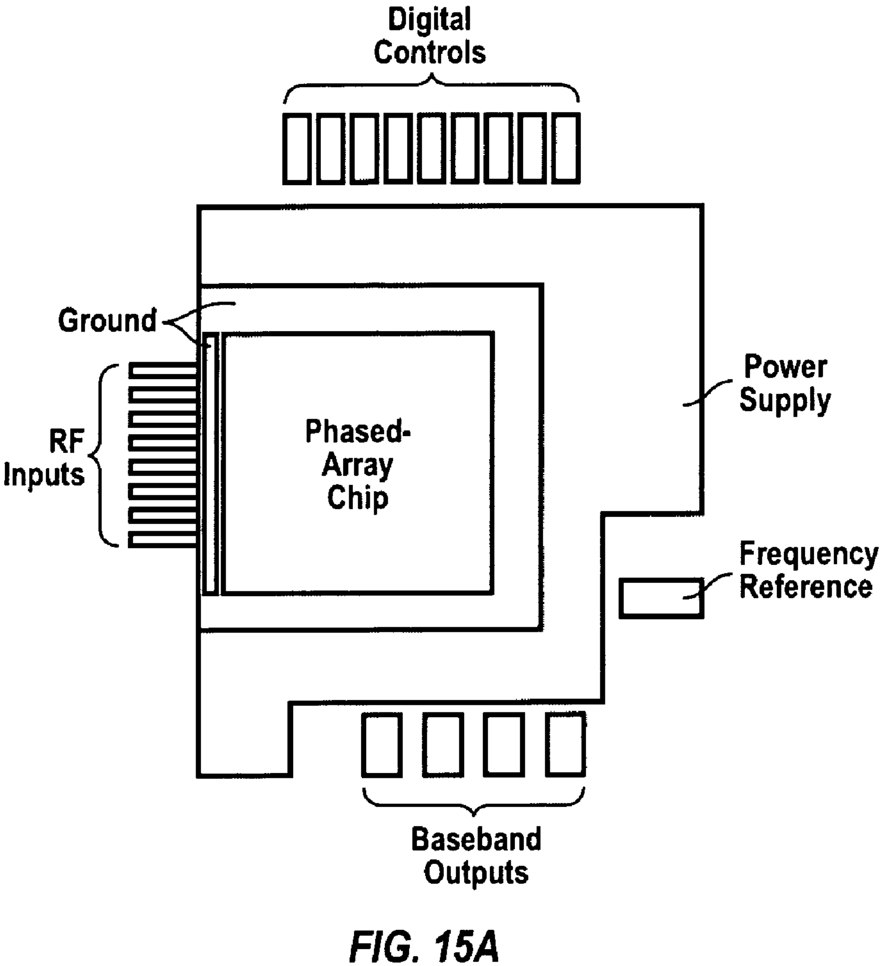
FIGS. 15A and 15B are top and cross sectional views of, in part, the die of FIG. 14 mounted-on a platform.
Figure 15B:
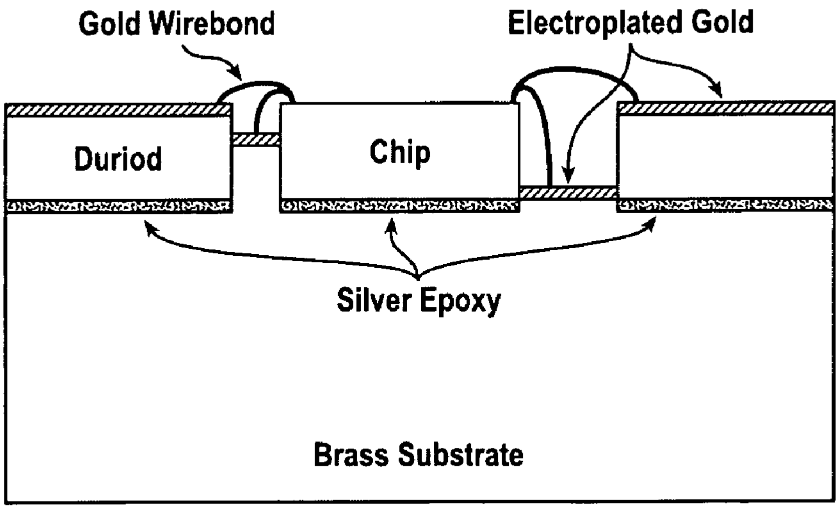

Referring to FIGS. 15A and 15B, the die and test board are mounted on brass platform using silver epoxy, as shown in FIG. 15B. The thickness of the employed Duroid board is chosen to be 10 mil, which has approximately the same height as the chip. This minimizes signal bond wire length and curvature. A 3.5 mm long brass step with width and height of 200 μm is built along the RF side of the chip. The ground pads for the RF circuitry are wire-bonded to the top surface of this step to minimize the ground bond wire length. The inputs of every path are symmetrically wire-bonded to 50-ohm transmission lines on board.

Figure 16:
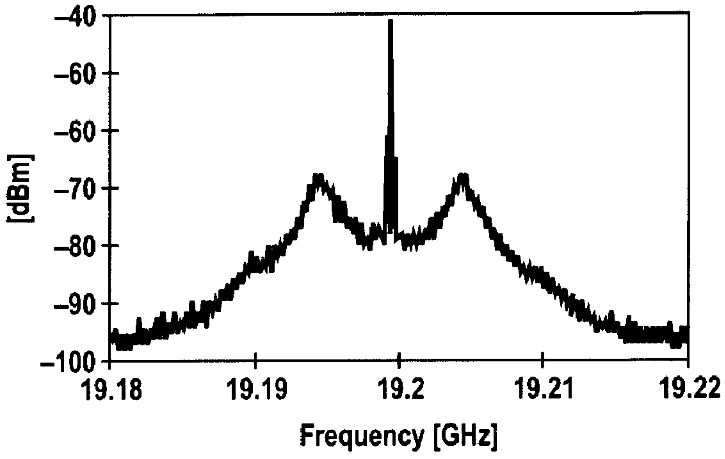
FIG. 16 shows the locked spectrum of frequency synthesizer of an exemplary phased-array, in accordance with one embodiment of the present invention.

The free running VCO achieves a phase noise of −103 dBc/Hz at 1 MHz offset. The frequency synthesizer is locked from 18.7-20.8 GHz with settling time less than 50 μsec. FIG. 16 shows the locked spectrum of frequency synthesizer.

Figure 17:
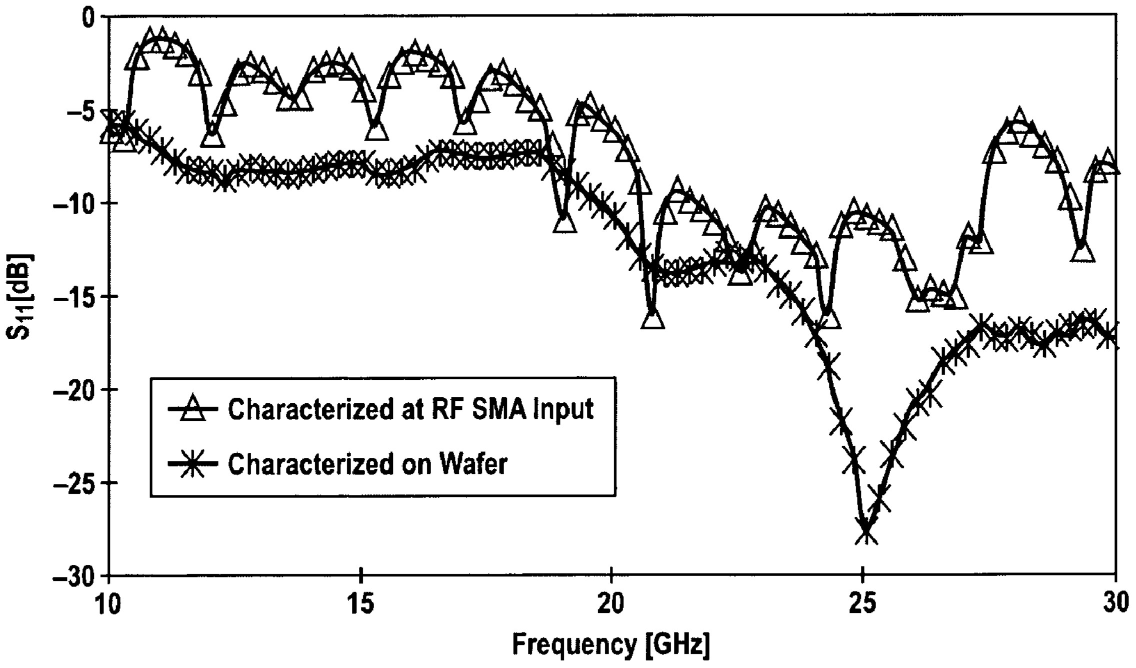
FIG. 17 shows the input reflection coefficients $S_{11}$ at 24 GHz RF ports as characterized both on chip and at the SMA connectors of the RF inputs on board.

The input reflection coefficients S11 at 24 GHz RF ports are characterized both on chip and at the SMA connectors of the RF inputs on board. The receiver demonstrates good input matching properties at frequency range of interest in both cases, as shown in FIG. 17.

Figure 18A:
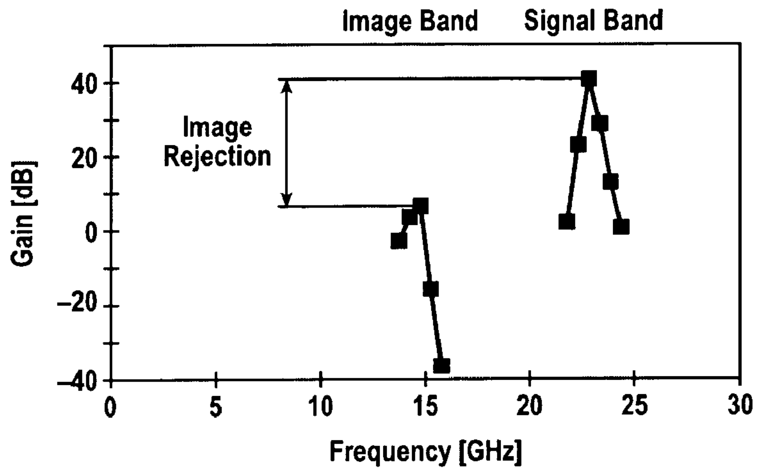
FIG. 18A shows an exemplary gain of a single path of the phased-array of FIG. 5.
Figure 18B:
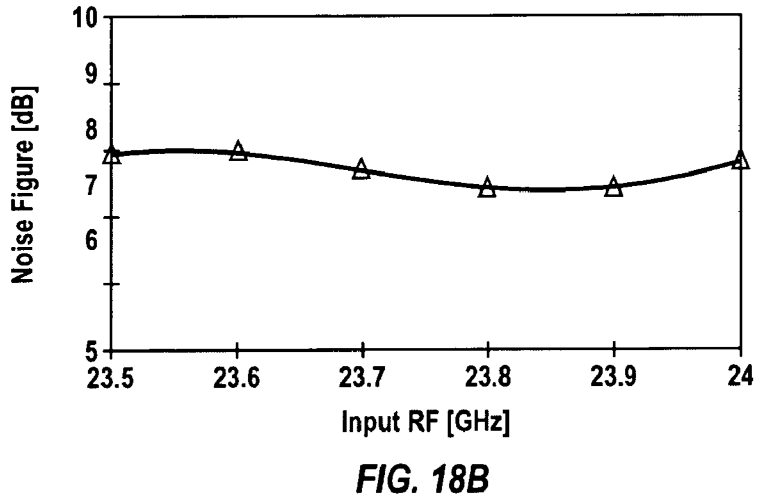
FIG. 18B shows an exemplary noise figure as a function of input frequency of the phased-array of FIG. 5.
Figure 18C:
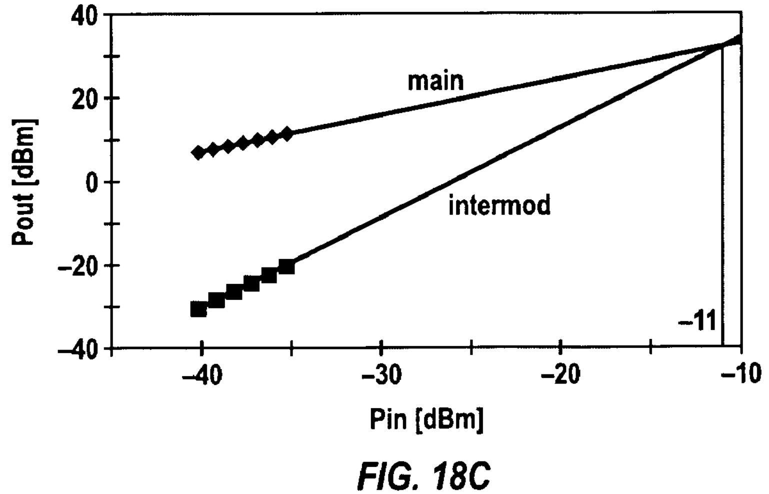
FIGS. 18C and 18D each shows an exemplary measured nonlinearity of a single path of the phased-array of FIG. 5.
Figure 18D:
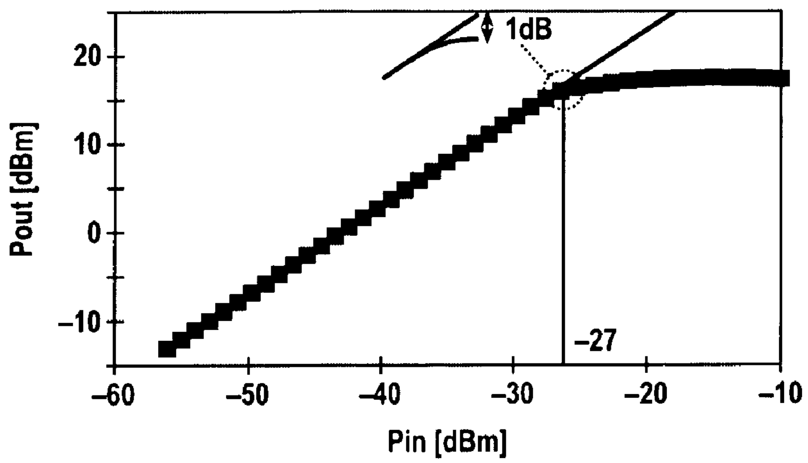

FIG. 18A depicts the gain of a single path as a function of the input frequency, showing 43 dB peak gain at 23 GHz and 35 dB on-chip image rejection. The image signals will be further attenuated by narrow band antennas. A 3 dB gain variation is observed among all paths. The receiver noise figure as a function of input frequency is shown in FIG. 18B. A double-side-band noise figure of 7.4 dB is measured over the signal bandwidth of 250 MHz. FIGS. 18C and 18D show the measured nonlinearity of a single path. The input-referred 1 dB compression point is observed at −27 dBm, and the input-referred intercept point of the third-order distortion is −11.5 dBm.

Figure 19:
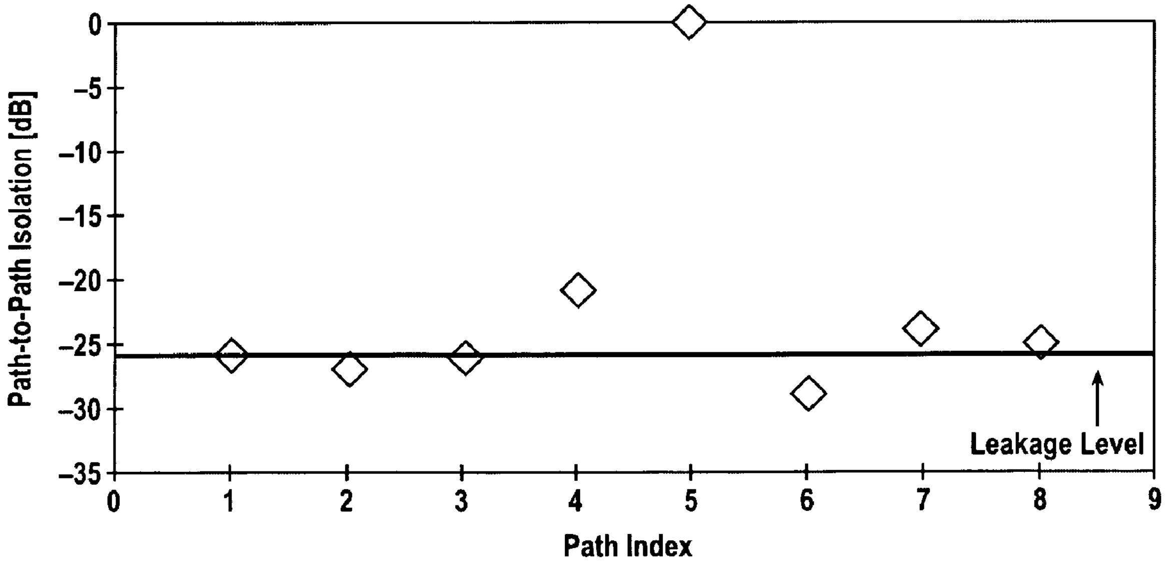
FIG. 19 shows an exemplary on-chip isolation between different paths of the phased-array of FIG. 5.

FIG. 19 shows the on-chip isolation between different paths. The signal is fed to the 5th path only. The phase selector of each path is turned on alternatively to measure the output power caused by coupling. When all phase selectors are off, the system has a −27 dB signal leakage (normalized to single path gain). The coupling is lower than −20 dB in all paths. The strongest coupling is seen between adjacent paths, e.g. the 4th and 5th paths as expected. However, when the phase selector at the 4th path is turned off and the one at the 6th path is turned on, a significantly lower output power is observed, which may due to the coexisting coupling and leakage canceling each other. The coupling between non-adjacent paths is close to or lower than the leakage level.

Figure 20:
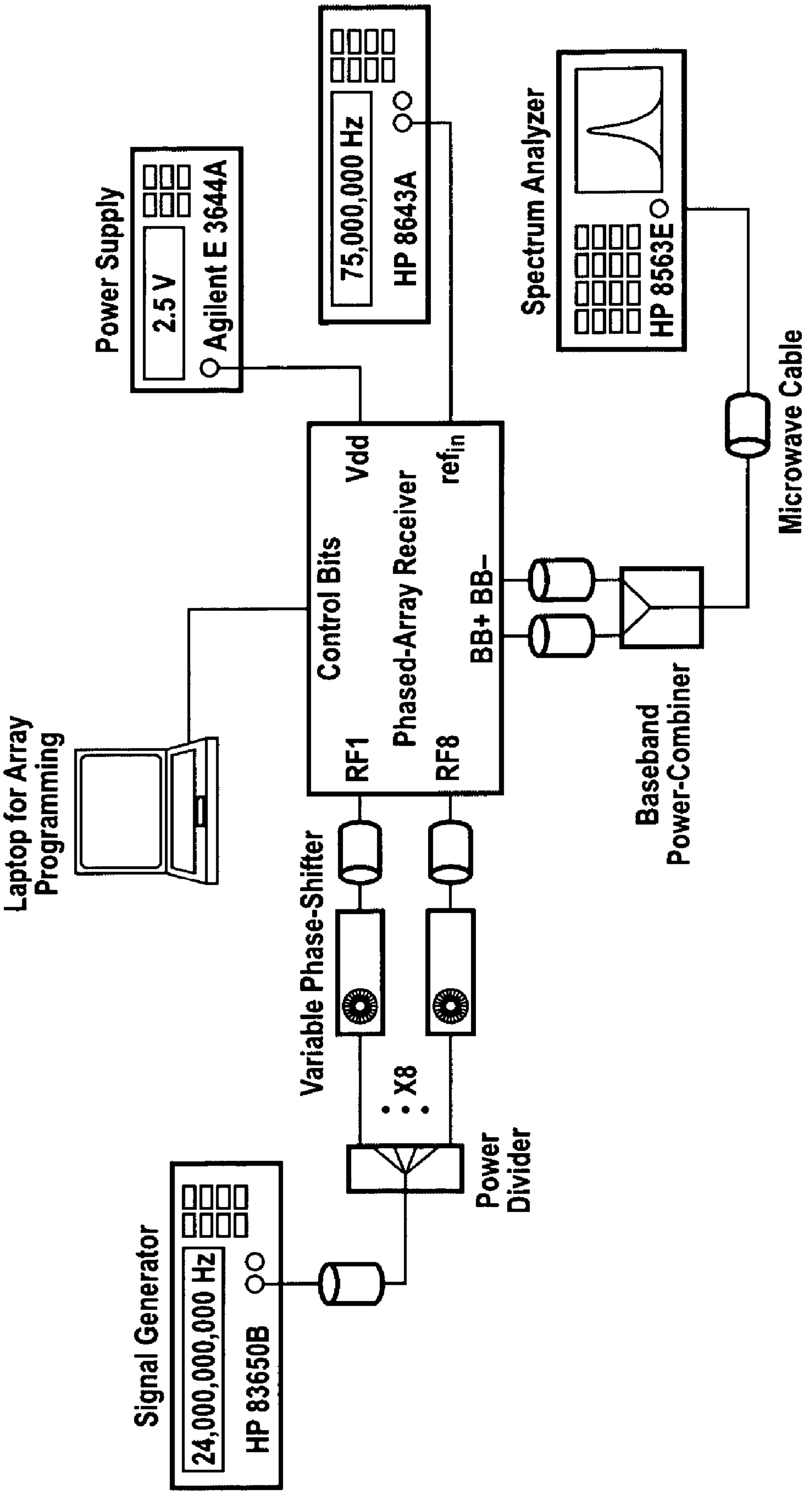
FIG. 20 shows an exemplary setup shown used to measure the performance of the phased-array of FIG. 5.
Figure 21:
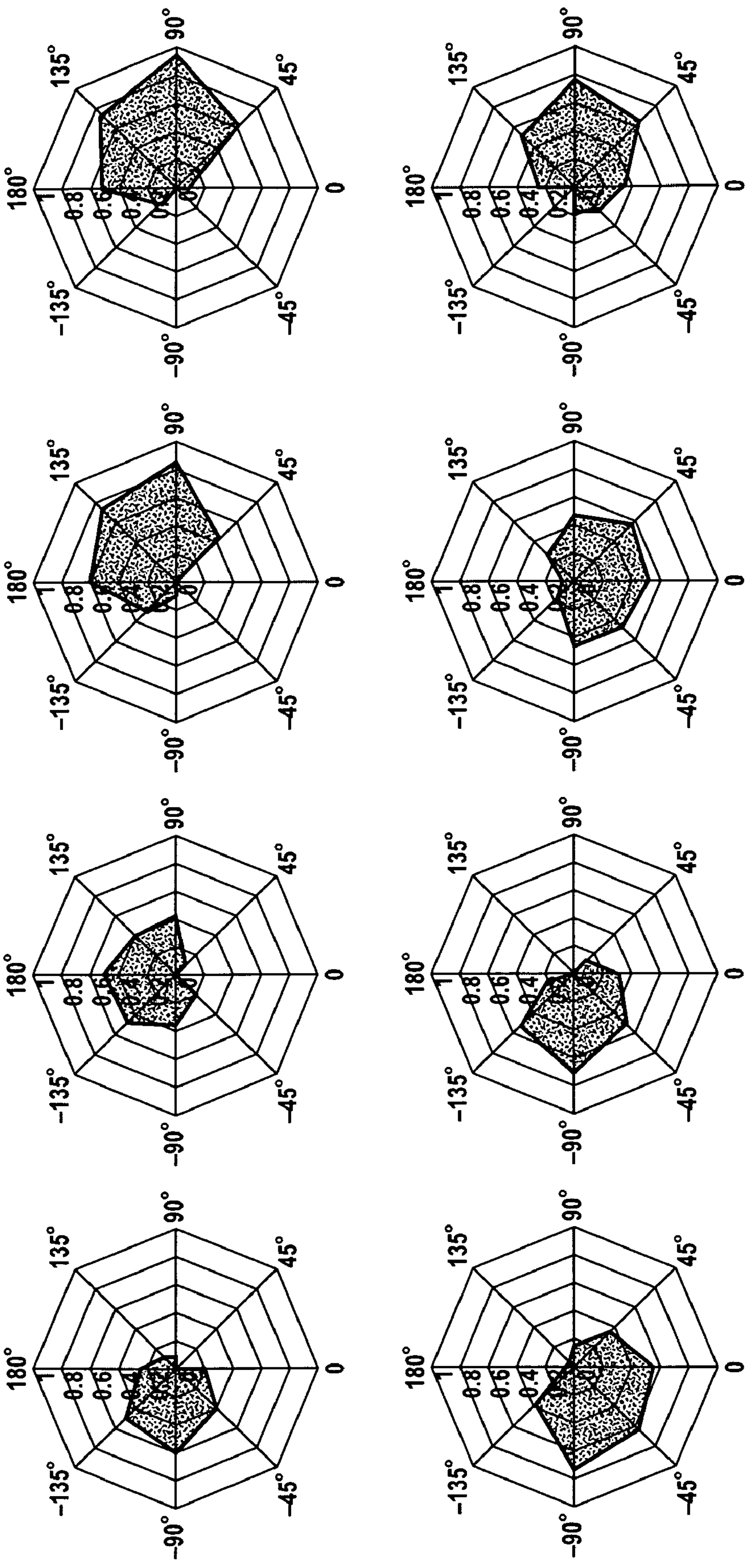
FIGS. 21 and 22 collectively show exemplary measured array patterns at different LO-phase settings for two and four-path operations of the phased-array of FIG. 5.
Figure 22:
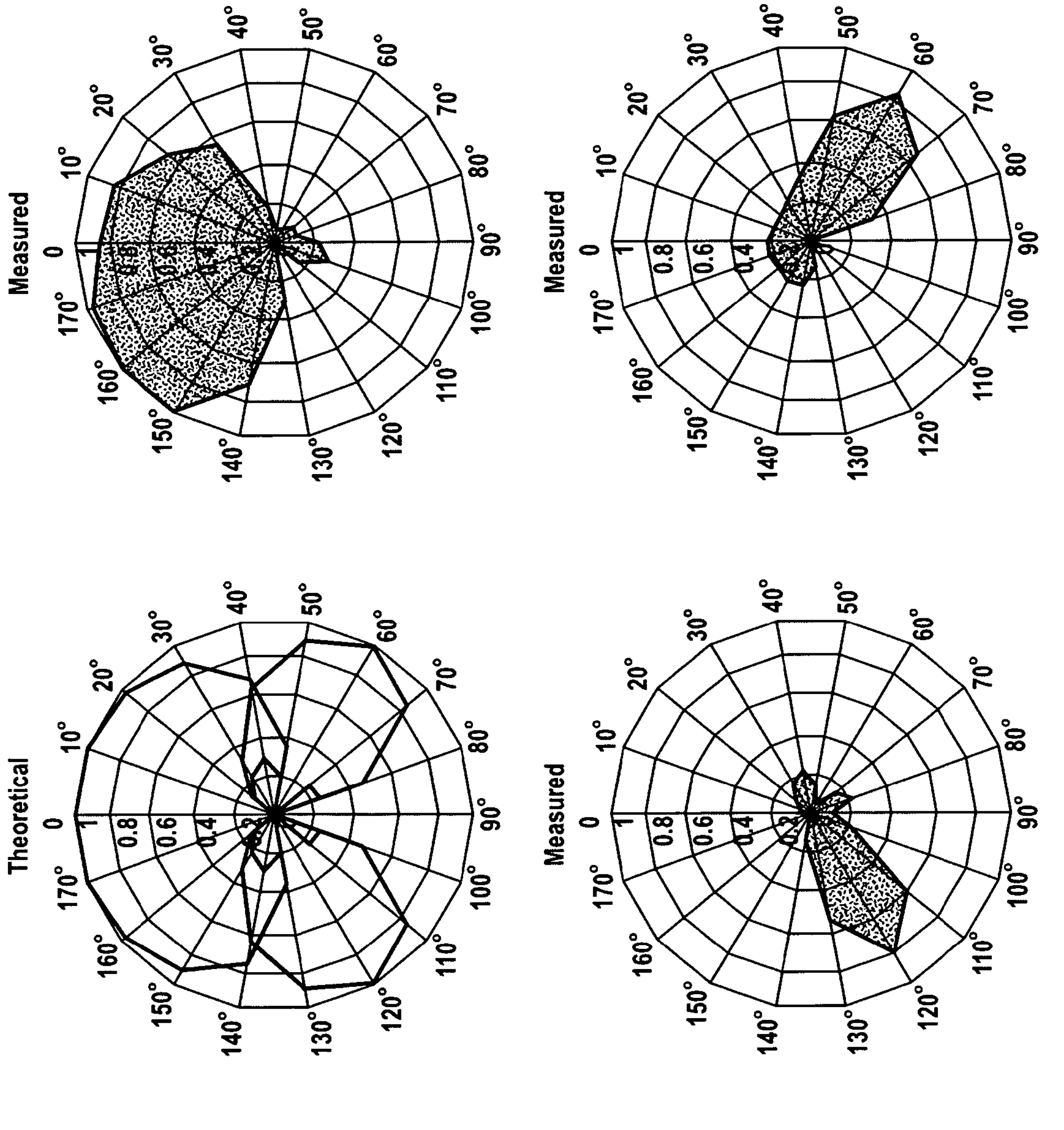

The array performance is assessed using the setup shown in FIG. 20. An artificial wave front is generated by feeding the RF inputs to each receiver path via power-splitters and adjustable phase-shifters. This way, the array performance is measured independently of the antenna properties. FIGS. 21 and 22 show the measured array patterns at different LO-phase settings for two and four-path operations, respectively. FIGS. 21 and 22 demonstrate the spatial selectivity of the phase-array receiver and its steering of the beam over the entire 180° range by LO phase programming.

The above embodiments of the present invention are illustrative and not limitative. Various alternatives and equivalents are possible. The invention is not limited by the type of transistors, Bipolar, CMOS, BICOMS or otherwise, disposed in the phased-array receiver of the present invention. The invention is not limited by the type of circuit used to generate various phases of the local oscillator. Nor is the invention limited by the type of circuit used to select the various phases of the local oscillator. The invention is not limited by the type of low-noise or IF amplifier. The invention is not limited by the type of RF or IF mixer disposed in the phased-array of the present invention. The invention is not limited to any particular RF, IF or baseband frequency. Nor is the invention limited by the number of paths disposed in the phased-array receiver. The invention is not limited by the type of integrated circuit in which the present invention may be disposed. Nor is the invention limited to any specific type of process technology, e.g., CMOS, Bipolar, or BICMOS that may be used to manufacture the phased-array receiver of the present invention. The invention is not limited to homodyne or heterodyne architectures. Other additions, subtractions or modifications are obvious in view of the present invention and are intended to fall within the scope of the appended claims.

What is claimed is:

1. An N-element phased-array receiver comprising:

N phase selectors each adapted to select an arbitrary phase of a local oscillator and to supply the selected phase as an output signal;

N first mixers each associated with a different one of the N phase selectors and adapted to receive the output signal supplied by its associated phase selector, each of the N first mixers further adapted to receive an RF signal received by a different one of N receive antennas and to generate an output signal having a phase that is shifted with respect to the phase of the RF signal received thereby and a frequency that is lower than the frequency of the received RF signal; and a shift register configured to receive input control signals and supply output control signals to the N phase selectors.

2. The N-element phased-array receiver of claim 1 wherein each arbitrary phase of the local oscillator is selected from among M generated phases of the local oscillator.

3. The N-element phased-array of claim 2 wherein each of the M generated phases of the local oscillator is a differential signal.

4. The N-element phased-array of claim 3 wherein the output signal generated by each of the N first mixers is a differential signal.

5. The N-element phased-array of claim 4 wherein said summed signal is a differential signal.

6. The N-element phased-array receiver of claim 1 further comprising a summing block adapted to receive and sum the N output signals generated by the N first mixers to generate a summed signal, wherein the summing block is adapted to operate at an intermediate frequency (IF).

7. The N-element phased-array of claim 6 wherein said summing block is adapted to sum the N signals that are current signals to generate a summed current signal.

8. The N-element phased-array of claim 6 wherein said summing block is adapted to sum the N signals that are voltage signals to generate a summed voltage signal.

9. The N-element phased-array of claim 6 further comprising:

an amplifier adapted to receive and amplify the summed signal to generate an amplified summed signal, wherein said amplifier is adapted to operate at an IF.

10. The N-element phased-array of claim 9 wherein said amplified summed signal is a differential signal.

11. The N-element phased-array of claim 6 further comprising:

a second mixer adapted to receive the summed signal and a first divided-down phase of the local oscillator to generate a first signal representative of the received RF signal.

12. The N-element phased-array of claim 11 further comprising:

a third mixer adapted to receive the summed signal and a second divided-down phase of the local oscillator to generate a second signal representative of the received RF signal, wherein said first and second divided-down phases of the local oscillator are IF signals being 90° out of phase with respect to one another.

13. The N-element phased-array of claim 12 wherein said summed signal is a differential signal, wherein each of said first and second divided-down phases of the local oscillator is a differential signal, and wherein each of the first and second signals representative of the received IF signal is a differential signal.

14. The N-element phased-array receiver of claim 12 further comprising:

a frequency divider block adapted to divide the frequency of the local oscillator signal and to supply said first and second divided-down phases of the local oscillator.

15. The N-element phased-array receiver of claim 12 wherein said phased-array is formed on a single semiconductor substrate.

16. The N-element phased-array receiver of claim 6 wherein said summing circuit includes a symmetric binary tree current adding circuit.

17. The N-element phased-array of claim 6 further comprising:

a second mixer adapted to receive the summed signal and a first phase of the local oscillator to generate a first signal representative of the received RF signal.

18. The N-element phased-array of claim 17 further comprising:

a third mixer adapted to receive the summed signal and a second phase of the local oscillator to generate a second signal representative of the received RF signal, wherein said first and second phases of the local oscillator are 90° out of phase with respect to one another.

19. The N-element phased-array of claim 1 further comprising:

N low-noise amplifiers each associated with a different one of the N antennas and a different one of the N first mixers, wherein each low-noise amplifier is adapted to receive the RF signal received by its associated antenna and to supply an amplified RF signal to its associated RF mixer.

20. The N-element phased-array of claim 19 wherein the RF signal received by each of the N low-nose amplifiers is a differential RF signal.

21. The N-element phased-array receiver of claim 19 wherein each low-noise amplifier includes an inductively degenerated common-emitter amplifier and is adapted to provide a high gain and low noise.

22. The N-element phased-array receiver of claim 19 wherein each low noise amplifier has an output that is impedance-matched to an input of its associated first mixer.

23. The N-element phased-array receiver of claim 1 further comprising:

an M-phase oscillator adapted to generate the M phases of the local oscillator.

24. The N-element phased-array receiver of claim 23 wherein said M-phase oscillator includes an M-phase CMOS ring voltage-controlled oscillator.

25. The N-element phased-array receiver of claim 1 further comprising a phase-locked loop adapted to generate the M phases of the local oscillator, said phased-locked loop further comprising:

a voltage controlled oscillator;

a loop filter;

a charge pump;

a phase/frequency detector;

a divide-by-four circuit; and a divide-by-sixty four circuit.

26. The N-element phased-array receiver of claim 1 wherein said local oscillator signal has a frequency of 19.2 GHz adapted to be locked to a reference clock signal that has a frequency of 75 MHz.

27. The N-element phased-array receiver of claim 1 wherein each of the N first mixers includes a Gilbert double-balanced multiplier adapted to downconvert a single-ended received RF signal to a lower frequency differential signal.

28. The N-element phased-array receiver of claim 27 wherein said RF signal has a frequency of 24 GHz and said downconverted signal has a frequency of 4.8 GHz.

29. The N-element phased-array receiver of claim 1 wherein said N is equal to 8 and said M is equal to 16.

30. The N-element phased-array receiver of claim 1 further comprising a summing block adapted to receive and sum the N output signals generated by the N first mixers to generate a summed signal, wherein the summing block is adapted to operate at a baseband frequency.

31. A method comprising:

receiving N arbitrary phases of a local oscillator;

receiving N RF signals each having a phase and a frequency;

shifting the phase of each of the N RF signals in accordance with a different one of the N arbitrary phases of the local oscillator;

lowering the frequency of each of the received N RF signals so as to generate N first signals each having a frequency lower than the RF frequency and a phase that is the phase of a different one of the N phase-shifted RF signals and selecting each of the N arbitrary phases from one of M generated phases of the local oscillator in response to a control signal applied to a shift register.

32. The method of claim 31 wherein each of the N arbitrary phases of the local oscillator is selected from among M generated phases of the local oscillator.

33. The method of claim 32 wherein each of the M generated phases of the local oscillator is a differential signal.

34. The method of claim 33 wherein each of the N first signals is a differential signal.

35. The method of claim 34 wherein said summed signal is a differential signal.

36. The method of claim 32 wherein said N is equal to 8 and said M is equal to 16.

37. The method of claim 31 further comprising:

summing the N first signals at an intermediate frequency (IF) to generate a summed signal.

38. The method of claim 37 wherein said N first signals are current signals and said summed signal is a current signal.

39. The method of claim 37 wherein said N first signals are voltage signals and said summed signal is a voltage signal.

40. The method of claim 37 further comprising:

amplifying the summed signal at an IF to generate an amplified summed signal.

41. The method of claim 40 wherein amplified summed signal is a differential signal.

42. The method of claim 37 further comprising:

generating a first signal representative of the received RF signal in response to the summed signal and a first divided-down phase of the local oscillator.

43. The method of claim 42 further comprising:

generating a second signal representative of the received RF signal in response to the summed signal and a second divided-down phase of the local oscillator, said first and second divided-down phases of the local oscillator are IF signals being 90° out of phase with respect to one another.

44. The method of claim 43 wherein said summed signal is a differential signal, wherein each of said first and second divided-down phases of the local oscillator is a differential signal, and wherein each of the first and second signals representative of the received IF signal is a differential signal.

45. The method of claim 43 further comprising:
dividing the frequency of the local oscillator signal to generate said first and second divided-down phases of the local oscillator.

46. The method of claim 37 further comprising:
summing the N first signals using a symmetric binary tree current adding circuit.

47. The method of claim 37 further comprising:
generating a first signal representative of the received RF signal in response to the summed signal and a first phase of the local oscillator.

48. The method of claim 47 further comprising:
generating a second signal representative of the received RF signal in response to the summed signal and a second phase of the local oscillator, wherein said first and second phases of the local oscillator are 90° out of phase with respect to one another.

49. The method of claim 31 further comprising:
amplifying the N received RF signals; and
generating the N first signals in response to receipt of the N arbitrary phases of the local oscillator and the N amplified RF signals.

50. The method of claim 49 wherein each of the N received RF signals is a differential RF signal.

51. The method of claim 49 wherein each of the N received RF signals is amplified by a low-noise amplifier, each low-noise amplifier further comprising an inductively degenerated common-emitter amplifier with a feedthrough resistor and adapted to provide a high gain and low noise.

52. The method of claim 51 wherein each of the N first signals is generated by a different one of N mixers each of which further comprises a Gilbert double-balanced multiplier adapted to downconvert a single-ended received RF signal to a lower frequency differential signal.

53. The method of claim 52 wherein said RF signal has a frequency of 24 GHz and said downconverted signal has a frequency of 4.8 GHz.

54. The method of claim 52 wherein each low noise amplifier has an output that is impedance-matched to an input of one of the N mixers associated therewith.

55. The method of claim 31 wherein said local oscillator is an M-phase local oscillator.

56. The method of claim 55 wherein said M-phase oscillator comprises an M-phase CMOS ring voltage-controlled oscillator.

57. The method of claim 31 wherein the M phases are generated by a phased-locked loop further comprising:
a voltage controlled oscillator;
a loop filter;
a charge pump;
a phase/frequency detector;
a divide-by-four circuit; and
a divide-by-sixty four circuit.

58. The method of claim 31 wherein said local oscillator signal has a frequency of 19.2 GHz adapted to be locked to a reference clock signal that has a frequency of 75 MHz.

59. The method of claim 31 further comprising:
summing the N first signals at a baseband frequency to generate a summed signal.

* * * * *

UNITED STATES PATENT AND TRADEMARK OFFICE

CERTIFICATE OF CORRECTION

PATENT NO. : 7,502,631 B2

APPLICATION NO. : 10/988199

DATED : March 10, 2009

INVENTOR(S) : Hossein Hashemi, Xiang Guan and Seyed Ali Hajimiri

It is certified that error appears in the above-identified patent and that said Letters Patent is hereby corrected as shown below:

Please insert before the BACKGROUND OF THE INVENTION Section (column 1 line 15)

--STATEMENT AS TO RIGHTS TO INVENTIONS MADE UNDER FEDERALLY SPONSORED RESEARCH OR DEVELOPMENT

The U.S. Government has certain rights in this invention pursuant to Grant No. ECS-0239343 and EEC-9402726, awarded by The National Science Foundation.--

Signed and Sealed this

Twenty-sixth Day of May, 2009

JOHN DOLL

*Acting Director of the United States Patent and Trademark Office*